(12) United States Patent
Topliss et al.

(10) Patent No.: US 8,350,959 B2
(45) Date of Patent: Jan. 8, 2013

(54) CAMERA LENS ACTUATION APPARATUS

(75) Inventors: Richard Topliss, Cambridge (GB); David Livingstone, Royston (GB); Robert John Leedham, Cambridge (GB)

(73) Assignee: 1 ... Limited, Cambridge (GB)

(*) Notice: Subject to any disclaimer, the term of this patent is extended or adjusted under 35 U.S.C. 154(b) by 882 days.

(21) Appl. No.: 12/295,382

(22) PCT Filed: Mar. 23, 2007

(86) PCT No.: PCT/GB2007/001050
§ 371 (c)(1), (2), (4) Date: Sep. 30, 2008

(87) PCT Pub. No.: WO2007/113478
PCT Pub. Date: Oct. 11, 2007

(65) Prior Publication Data
US 2009/0295986 A1 Dec. 3, 2009

(30) Foreign Application Priority Data

| Mar. 30, 2006 | (GB) | 0606425.7 |
| Aug. 17, 2006 | (GB) | 0616327.3 |
| Sep. 5, 2006 | (GB) | 0617455.1 |
| Sep. 14, 2006 | (GB) | 0618112.7 |
| Oct. 16, 2006 | (GB) | 0620474.7 |
| Feb. 9, 2007 | (GB) | 0702580.2 |

(51) Int. Cl.
*H04N 5/225* (2006.01)
*H04N 5/228* (2006.01)
*H04N 9/083* (2006.01)
*G03B 13/18* (2006.01)
*G03B 15/03* (2006.01)
*G03B 17/00* (2006.01)
*G03B 3/00* (2006.01)

(52) U.S. Cl. .......... 348/374; 359/819; 396/89; 396/177; 396/73; 396/75; 396/90; 348/208.11; 348/373; 348/291; 348/335

(58) Field of Classification Search ............ 348/333.11, 348/202, 208.11, 360, 291, 224.1, 340, 335–339, 348/341–344, 373–376; 396/73, 75, 90, 396/91, 133, 199, 298, 342, 354, 382, 451
See application file for complete search history.

(56) References Cited

U.S. PATENT DOCUMENTS
4,977,886 A 12/1990 Takehana et al.
(Continued)

FOREIGN PATENT DOCUMENTS
EP 0 841 510 A1 5/1998
(Continued)

OTHER PUBLICATIONS

International Search Report for PCT/GB2007/001050, mailed Aug. 30, 2007.

(Continued)

*Primary Examiner* — Nhan T Tran
*Assistant Examiner* — Stephen Coleman
(74) *Attorney, Agent, or Firm* — Nixon & Vanderhye, P.C.

(57) ABSTRACT

A camera lens actuation apparatus for driving motion of a camera lens supported on a support structure by a suspension system. The apparatus incorporates a subassembly comprising SMA wire connected to at least one mounting member which is mounted to the support structure. At least one pair of lengths of SMA wire are held in tension between the camera lens element and the support structure at respective acute angles to the optical axis applying a tensional force having a component along the optical axis. The lengths of SMA wire in the pair are held at angle as viewed along the optical axis. There may be plural pairs with a balanced arrangement in which the forces generated have no net component perpendicular to the optical axis and generate no net torque around any axis perpendicular to the optical axis. A control circuit controls heating of the SMA wire in response to a measure of its resistance.

36 Claims, 14 Drawing Sheets

U.S. PATENT DOCUMENTS

| | | | |
|---|---|---|---|
| 5,150,702 A | 9/1992 | Miyanaga et al. | |
| 5,459,544 A | 10/1995 | Emura | |
| 5,484,752 A * | 1/1996 | Waku et al. | 501/127 |
| 5,763,979 A | 6/1998 | Mukherjee et al. | |
| 6,157,779 A | 12/2000 | Kosaka et al. | |
| 6,307,678 B2 | 10/2001 | Kosaka et al. | |
| 6,434,333 B2 | 8/2002 | Tanaka et al. | |
| 6,434,932 B2 | 8/2002 | Hara et al. | |
| 6,449,434 B1 | 9/2002 | Fuss | |
| 6,516,146 B1 | 2/2003 | Kosaka | |
| 6,554,501 B2 | 4/2003 | Kosaka et al. | |
| 6,574,958 B1 | 6/2003 | MacGregor | |
| 6,833,656 B2 | 12/2004 | Hooley et al. | |
| 6,945,045 B2 | 9/2005 | Hara et al. | |
| 7,068,930 B2 | 6/2006 | McKevitt et al. | |
| 7,224,813 B2 | 5/2007 | Hooley et al. | |
| 7,295,389 B2 | 11/2007 | Ohtsuka et al. | |
| 2001/0002226 A1 | 5/2001 | Tanaka et al. | |
| 2001/0025477 A1 | 10/2001 | Hara et al. | |
| 2002/0001467 A1* | 1/2002 | Tanaka et al. | 396/177 |
| 2002/0113499 A1 | 8/2002 | Von Behrens et al. | |
| 2006/0048511 A1 | 3/2006 | Everson et al. | |
| 2006/0067658 A1* | 3/2006 | Wirt | 396/6 |
| 2006/0098968 A1 | 5/2006 | Ito et al. | |
| 2006/0109570 A1* | 5/2006 | Ohtsuka et al. | 359/819 |
| 2006/0120708 A1* | 6/2006 | Kosaka et al. | 396/55 |
| 2006/0147190 A1* | 7/2006 | Topliss et al. | 396/133 |
| 2006/0150627 A1 | 7/2006 | Oohara | |
| 2006/0185359 A1 | 8/2006 | Hamaguchi et al. | |
| 2006/0209195 A1 | 9/2006 | Goto | |
| 2006/0266031 A1 | 11/2006 | Kosaka et al. | |
| 2006/0272328 A1* | 12/2006 | Hara et al. | 60/527 |
| 2007/0047938 A1* | 3/2007 | Suzuki et al. | 396/89 |
| 2007/0058070 A1 | 3/2007 | Chen | |
| 2007/0294873 A1* | 12/2007 | Bogursky et al. | 29/34 D |
| 2008/0278030 A1 | 11/2008 | Hara et al. | |
| 2008/0278590 A1 | 11/2008 | Tanimura et al. | |
| 2008/0282696 A1 | 11/2008 | Wada et al. | |
| 2009/0295986 A1 | 12/2009 | Topliss et al. | |
| 2010/0060776 A1 | 3/2010 | Topliss et al. | |
| 2010/0074607 A1 | 3/2010 | Topliss et al. | |
| 2010/0074608 A1 | 3/2010 | Topliss | |
| 2010/0275592 A1 | 11/2010 | Topliss et al. | |
| 2010/0283887 A1 | 11/2010 | Topliss et al. | |

FOREIGN PATENT DOCUMENTS

| | | | |
|---|---|---|---|
| EP | 1 626 177 A1 | 2/2006 | |
| EP | 1 640 757 | 3/2006 | |
| EP | 1640757 A1 | 3/2006 | |
| EP | 1 666 216 A1 | 6/2006 | |
| EP | 1 914 422 A1 | 4/2008 | |
| EP | 2 239 610 A1 | 10/2010 | |
| GB | 2 398 854 A | 9/2004 | |
| GB | 2 434 214 A | 7/2007 | |
| JP | 61-229977 | 10/1986 | |
| JP | 9-127398 | 5/1997 | |
| JP | 2002-99019 | 4/2002 | |
| JP | 2002-130114 | 5/2002 | |
| JP | 2004-38058 | 2/2004 | |
| JP | 2004-212882 | 7/2004 | |
| JP | 2004-333995 A | 11/2004 | |
| JP | 2005-195998 | 7/2005 | |
| JP | 2005-275270 | 10/2005 | |
| JP | 2006-330542 | 12/2006 | |
| JP | 2007-060530 A | 3/2007 | |
| JP | 2007-315352 | 12/2007 | |
| JP | 2007-333995 | 12/2007 | |
| JP | 2009-122602 A | 6/2009 | |
| WO | WO 94/19051 | 9/1994 | |
| WO | WO 01/47041 A2 | 6/2001 | |
| WO | WO 02/103451 A1 | 12/2002 | |
| WO | WO 03/048831 A2 | 6/2003 | |
| WO | WO 2005/003834 A1 | 1/2005 | |
| WO | WO 2005/026539 A2 | 3/2005 | |
| WO | WO 2005/075823 A1 | 8/2005 | |
| WO | WO 2005/093510 A2 | 10/2005 | |
| WO | WO 2006/054535 | 5/2006 | |
| WO | WO 2006/059098 A1 | 6/2006 | |
| WO | WO 2006/061623 A1 | 6/2006 | |
| WO | WO 2006/105588 | 10/2006 | |
| WO | WO 2007/018086 A1 | 2/2007 | |
| WO | WO 2007/113478 A1 | 10/2007 | |
| WO | WO 2008/099155 A1 | 8/2008 | |
| WO | WO 2008/129290 A1 | 10/2008 | |
| WO | WO 2008/129291 A2 | 10/2008 | |
| WO | WO 2009/096207 A1 | 8/2009 | |

OTHER PUBLICATIONS

Written Opinion of the International Searching Authority for PCT/GB2007/001050, mailed Aug. 30, 2007.
International Search Report for PCT/GB2008/003657 mailed May 27, 2009.
Written Opinion of the International Searching Authority for PCT/GB2008/003657 mailed May 27, 2009.
International Search Report for PCT/GB2008/000478, mailed Sep. 24, 2008.
Written Opinion of the International Searching Authority for PCT/GB2008/000478, mailed Sep. 24, 2008.
U.S. Appl. No. 13/056,928, filed Apr. 11, 2011.
International Search Report for PCT/GB2009/001853 mailed Mar. 29, 2011.

* cited by examiner

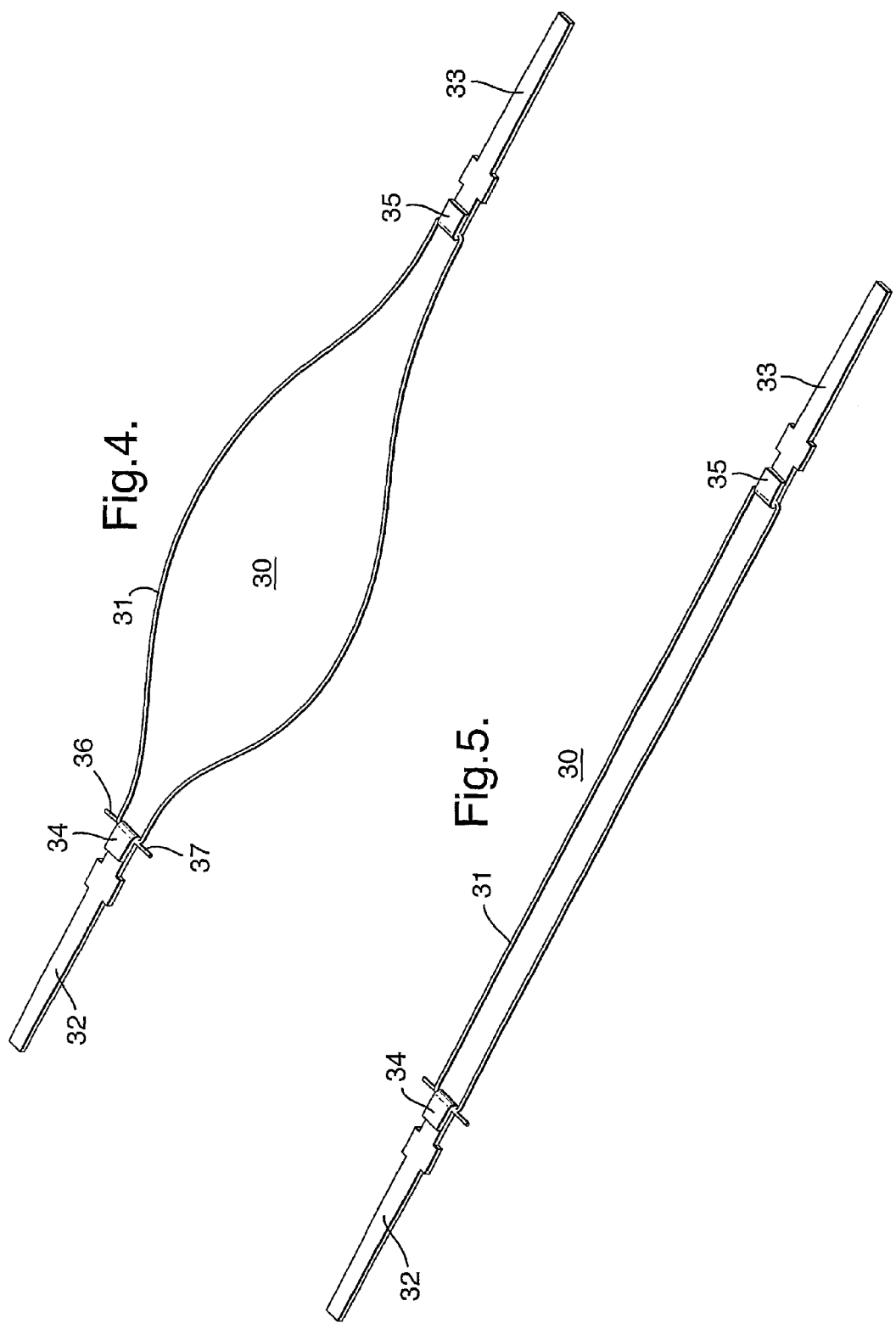

CAMERA LENS ACTUATION APPARATUS

This application is the U.S. national phase of International Application No. PCT/GB2007/001050 filed 23 Mar. 2007 which designated the U.S. and claims priority to Great Britain Application Nos. 0606425.7, filed 30 Mar. 2006; 0616327.3, filed 17 Aug. 2006; 0617455.1, filed 5 Sep. 2006; 0618112.7, filed 14 Sep. 2006; 0620474.7, filed 16 Oct. 2006; and 0702580.2, filed 9 Feb. 2007, the entire contents of each of which are hereby incorporated by reference.

The present invention relates to camera lens actuation apparatus using SMA (shape memory alloy) material as an actuator to drive movement of a camera lens element of the type used in a miniature camera which may be employed in a portable electronic device such as a mobile telephone or a mobile digital data processing and/or transmitting device.

In recent years, with the explosive spread of portable information terminals sometimes known as PDAs (portable digital assistants) and portable telephones, an increasing number of devices incorporate a compact digital camera apparatus employing an image sensor. When such a digital camera apparatus is miniaturized using an image sensor with a relatively small image-sensing area, its optical system, including one or more lenses, also needs to be miniaturized accordingly.

To achieve focusing or zooming, an actuation arrangement of some type must be included in the confined volume of such a miniature camera to drive movement of the camera lens element along the optical axis. As the camera lens element is small, the actuation arrangement must be capable of providing precise actuation over a correspondingly small range of movement. At the same time it is desired that the actuator arrangement is itself compact given the desire for miniaturization of the camera apparatus as a whole. In practical terms, these points limit the types of actuation arrangement which can be applied. Similar constraints apply to actuation arrangements for a wide range of other small objects.

Whilst most of the existing cameras rely on variations of the well-known electric-coil motor, a number of other actuation arrangements have been proposed as small drive units for the lens system. Such other actuation arrangements may include transducers based on piezoelectric, electrostrictive or magnetostrictive material, commonly referred to as electro-active devices and one example is an actuator comprising a curved structure of helically coiled piezoelectric bender tape as disclosed in WO-01/47041 which may be used as an actuator for a camera lens as described in WO-02/103451.

Another type of actuation arrangement which has been proposed uses shape memory alloy (SMA) material as an actuator. The SMA material is arranged on heating to drive movement of the camera lens element. Actuation may be achieved by control of the temperature of the SMA material over an active temperature range in which the SMA material changes between martensite and austenite phases in which the stress and strain of the SMA material changes. At low temperatures the SMA material is in the martensite phase, whereas at high temperatures the SMA material transforms into the austenite phase which induces a deformation causing the SMA material to contract. The temperature of the SMA material may be changed by selectively passing a current through the SMA material to heat it causing a phase change, the SMA material being arranged to cause the resultant deformation to drive movement of an object. The use of SMA material as an actuator for a small object such as the camera lens element of a miniature camera provides the advantages of being intrinsically linear, providing a high power per unit mass, being a low cost commodity item and being a relatively small component.

Despite these theoretical advantages of the use of SMA material as an actuator, in practice limitations imposed by the nature of SMA material make it difficult to design and manufacture SMA actuators, particularly in a miniature device. SMA material is most conveniently available as a wire.

In the case of a camera lens element, it is also necessary to consider the suspension system that suspends the camera lens element and guides movement along the optical axis. The axis of the lens element must suffer a minimum of deviance from the nominal camera axis when travelling along the camera axis or when the camera and telephone are orientated in different positions. The deviance may be in the form of a relative angular tilt and/or linear translation of the axes. These deviances may cause a degradation of image quality. Thus the suspension system ideally has a low stiffness or resistive force in the direction of the desired motion and high stiffness in all other directions.

Examples of suitable suspension systems are described in: WO2005/003834 which describes a suspension system comprising, at its simplest, a form of four-bar link or parallelogram suspension; WO-03/048831 and WO2006/059098 which both describe a suspension system comprising two resilient members held in a flexed state with portions on each side of a central point having opposite curvature so that the shape approximates to a sine wave; WO-2006/061623 which describes a suspension system comprising at least two, wide hinged linkages arranged perpendicular to each other; and the co-pending British Application No. 0600911.2 which describes a suspension system which comprises at least one elastic member which accommodates movement predominately by change in orientation and stretching.

When using SMA wire as an actuator, the SMA wire is advantageously held in tension between the camera lens element and the support structure with lengths of the SMA wire at respective acute angles to the optical axis. The lengths of SMA wire apply a tensional force having a component along the optical axis. As the fractional change in lengths of SMA wire is limited by the physical properties of the SMA material itself, if the SMA wire was arranged parallel to the movement direction it would be difficult to achieve a sufficient degree of movement for a camera lens element, for example to provide focusing or zooming. However, by arranging lengths of SMA wire at acute angles to the optical axis, the degree of movement along the optical axis for a given change in length of the SMA wire is increased. This is because the angled orientation of the SMA wire effectively provides gearing, as the change in length of the SMA wire causes the orientation of the SMA wire to change so that the degree of movement along the optical axis is greater than the actual change in length of the wire resolved along the optical axis.

The first aspect of the present invention is concerned with maximising the degree of movement along the optical axis. This must be achieved within the practical constraint of the size of the actuation apparatus being limited. In general any degree of movement could be achieved by using a wire of sufficient length but this would increase the size of the actuation apparatus and competes with the desire for miniaturisation.

According to the first aspect of the present invention, there is provided a camera lens actuation apparatus comprising:
a support structure;
a camera lens element supported on the support structure by a suspension system which guides movement of the camera lens element relative to the support structure along the optical axis of the camera lens element; and at least one pair of lengths of SMA wire held in tension between the camera lens element and the support structure, the lengths of SMA wire in the pair being coupled to one of the camera lens element and the support structure at a common point and extending therefrom at acute angles of opposite sign relative to the optical axis as viewed radially of the optical axis, the lengths of SMA wire in the pair extending at an angle of less than 180° relative to each other as viewed along the optical axis.

Thus actuation is provided by use of two lengths of SMA wire in a pair coupled to one of the camera lens element and the support structure at a common point and extending therefrom at acute angles relative to the optical axis of opposite sign as viewed radially of the optical axis. The acute angle of the wires provides the gearing effect described which increase the degree of movement as compared to wires extending along the optical axis.

As compared to a single wire, the use of two wires provides increased force. The angled arrangement with both wires coupled at a common point and extending at acute angles of opposite sign provides some degree of balancing of the forces generated by the wires in directions perpendicular to the optical axis. Such off-axis forces are inevitable with wires arranged at an acute angle and tend to laterally displace or tilt the lens element. Whilst such off-axis forces can be resisted by the design of the suspension system, this limits the choice of the suspension system and tends to require a suspension system which has high frictional forces and is not compact. Therefore the balancing provided by the angled arrangement is advantageous and improves the choice of suspension system, for example facilitating use of flexures.

In addition, the wires are arranged at an angle of less than 180°, preferably 90°, relative to each other as viewed along the optical axis. Thus the plane of the V-shape formed by the pair of wires may be considered to be angled or inclined relative to the optical axis. This allows the degree of displacement to be further improved within the practical constraint discussed above of limiting the size of the apparatus as a whole. If there is no angle between the wires as viewed along the optical axis, then the wires protrude outwardly from the optical axis. The length of the wires and hence their angle to the optical axis is therefore limited by the practical consideration of needing to limit the area of the apparatus perpendicular to the optical axis. However, by arranging the wires at an angle as viewed along the optical axis it is possible to increase the length of the wires and arrange them at an increased angle to the optical axis. For example in the preferred case that the angle is 90° each wire can extend along one side of a apparatus having a square cross-section perpendicular to the optical axis. This provides a compact camera apparatus having a square cross-section only slightly larger than the diameter of the lens element itself, but in which the length of the wires is the full width of the camera apparatus. By so increasing the length of the wires and their angle to the optical axis, the degree of movement provided by the actuators is correspondingly increased.

When using SMA wire as an actuator, the SMA wire is advantageously held in tension between the camera lens element and the support structure with lengths of the SMA wire at respective acute angles to the optical axis. This is for the reasons set out above.

However, arranging lengths of SMA wire at an acute angle to the optical axis provides the disadvantage that the SMA wire also provides off-axis forces, that is forces with a component perpendicular to the optical axis. Such forces tend to laterally displace or tilt the lens element. Such off-axis forces can be resisted by the design of the suspension system. However, this limits the choice of the suspension system and tends to require a suspension system which has high frictional forces and is not compact.

For example, one type of suspension system with a high resistance to off-axis forces is a bearing in which a movable bearing element contacts and runs along a rod or a track. In this case, off-axis resistance is provided by the reaction between the bearing element and the rod or track. However, a bearing is a type of suspension system having relatively high frictional forces and being of relatively large size. As such a bearing is not advantageous in the case of a camera lens element, particularly for a miniature camera.

Conversely, one advantageous type of suspension system for a camera lens element comprises a plurality of resilient flexures coupled between the camera lens element and the support structure. However whilst such resilient flexures provide a sufficient degree of off-axis resistance to guide movement of the camera lens element along the optical axis, it is inconvenient to use flexures of a sufficiently large size to resist the off-axis forces of the magnitude generated by SMA wires arranged at an acute angle to the optical axis.

According to the second aspect of the present invention, there is provided a camera lens actuation apparatus comprising:

a support structure;

a camera lens element supported on the support structure by a suspension system which guides movement of the camera lens element relative to the support structure along the optical axis of the camera lens element;

a plurality of lengths of SMA wire held in tension between the camera lens element and the support structure at respective acute angles to the optical axis applying a tensional force having a component along the optical axis, the lengths of SMA wire being held in positions and orientations around the optical axis such that the forces generated between the camera lens element and the support structure by the lengths of SMA wire when heated by a current of the same value in each length of SMA wire have a net component along the optical axis but have substantially no net component perpendicular to the optical axis and provide substantially no net torque around any axis perpendicular to the optical axis.

Thus, the lengths of SMA wire are held in positions and orientations around the optical axis such that they provide a balanced arrangement with substantially no off-axis movement or tilting of the camera lens element. This in turn allows the use of lens suspension systems having a relatively weak off-axis resistance because the suspension system only needs provide sufficient off-axis resistance to guide movement of the camera lens element along the optical axis. This increases the choice of available lens suspension systems.

For example, the second aspect of the present invention is particularly advantageous with a lens suspension system which comprises a plurality of resilient flexures coupled between the object and the support structure, the flexures being flexed to provide biasing against the tensional force applied by the SMA wire. Such a suspension system is advantageous for suspending a camera lens element because it is compact and straightforward to manufacture. Furthermore, when applied in a camera lens actuation apparatus using SMA wire as an actuator, flexing of the flexures provides biasing of the object relative to the support structure in an opposite direction along said optical axis from the tensional force applied by the SMA wire.

Advantageously, said forces generated between the camera lens element and the support structure by the lengths of SMA wire when heated by a current of the same value in each length of SMA wire further provide substantially no net torque around the optical axis. In this case, the lengths of SMA wire do not tend to rotate the camera lens element around the optical axis. This is advantageous because it further reduces the constraint on the nature of the suspension system provided by the SMA wires. Conversely some torque around the optical axis is permissible because it is possible for the suspension system to accommodate some rotational movement and/or because such rotational movement may be acceptable optically if the lens(es) in the camera lens element are spherical or have a low degree of asphericity.

One advantageous arrangement is that the plurality of lengths of SMA wire are equal lengths of SMA wire held at respective acute angles to the optical axis of the same magnitude, a set of half the lengths of SMA wire being inclined upwardly and a set of half the lengths of SMA wire being inclined downwardly as viewed radially of the optical axis, the lengths of SMA wire in each set being arranged with rotational symmetry around the optical axis.

In this arrangement, the equal lengths and symmetrical arrangement make the actuation apparatus easy to design and to manufacture with the appropriate degree of balancing of forces generated in the SMA wires. Thus, also according to the second aspect of the present invention, there is provided a camera lens actuation apparatus comprising:

a support structure;

a camera lens element supported on the support structure by a suspension system which guides movement of the camera lens element relative to the support structure along the optical axis of the camera lens element;

a plurality of equal lengths of SMA wire held in tension between the camera lens element and the support structure at respective acute angles to the optical axis of the same magnitude, a set of half the lengths of SMA wire being inclined upwardly and a set of half the lengths of SMA wire being inclined downwardly as viewed radially of the optical axis, the lengths of SMA wire in each set being arranged with rotational symmetry around the optical axis.

Despite the known advantages of the use of SMA material as an actuator, in practice limitations imposed by the nature of SMA material make it difficult to manufacture SMA actuators, particularly in a miniature device. SMA material is most conveniently available as a wire. When manufacturing an actuator using SMA wire, it is difficult to attach the wires to other components with the necessary degree of accuracy in the length and tension of the wires. This is a particular problem where plural lengths of SMA wire are needed to provide the desired operating characteristics. In that case, it is difficult to control the lengths and tensions of the wires relative to each other.

Another problem is that there are practical difficulties in making the desired mechanical and electrical connections to the SMA wire, without damaging the SMA material and reducing its structural integrity.

In general terms, these practical difficulties during manufacture are very significant and have limited the use of SMA material as an actuator in mass-produced devices, despite the known advantages provided by the intrinsic properties of the SMA material itself.

According to the third aspect of the present invention, there is provided a method of manufacturing a camera lens actuation apparatus for driving motion of a camera lens element relative to a support structure, the method comprising:

making a subassembly comprising at least one piece of SMA wire connected to at least one mounting member to form a continuous loop including the SMA wire; and assembling the subassembly into an actuation apparatus comprising a support structure and a camera lens element supported on the support structure by a suspension system which guides movement of the camera lens element relative to the support structure along the optical axis of the camera lens element, by mounting the at least one mounting member to at least one of the support structure and the camera lens element with the at least one piece of SMA wire held in tension between the camera lens element and the support structure applying a tensional force along the optical axis.

Further according to the third aspect of the present invention, there is provided a camera lens actuation apparatus made in accordance with this method.

The third aspect of the present invention facilitates the manufacture of a camera lens actuation apparatus employing SMA wire as an actuator because the subassembly is made in a separate dedicated process with the SMA wire included in a continuous loop. This makes it straightforward to control the length of the SMA wire. It allows for independent manufacture and testing of the subassembly incorporating the SMA wire. Furthermore, as the SMA wire is included in a continuous loop in the subassembly, it is easy to arrange the SMA wire in the camera lens actuation apparatus with the appropriate tension, in particular providing an appropriate degree of balance between relative tensional forces developed in different lengths of the SMA wire.

Another advantage of the third aspect of the present invention is that the making of the physical connections to the SMA wire is facilitated by initially connecting the SMA wire to the mounting member(s) separately from the remainder of the camera lens actuation apparatus, and subsequently mounting the mounting member(s) onto the support structure and/or the camera lens element within the camera lens actuation apparatus.

Indeed, these advantages may be achieved even in the case that the subassembly is not arranged with the SMA wire included in a continuous loop. Hence, the third aspect of the present invention may further provide a method of manufacturing a camera lens actuation apparatus, and the resultant actuation apparatus, in which the subassembly does not form a continuous loop including the SMA wire.

In making the subassembly, the control of the length of the SMA wire may be provided by arranging the at least one piece of SMA wire taut on the at least one mounting member, and connecting the SMA wire to the at least one mounting member. For example, one possible technique is to wind taut the at least one piece of SMA wire around the at least one mounting member. In such a winding process it is possible to accurately control the length of the SMA wire under the applied tension using conventional techniques for winding wire.

The subassembly may include just a single mounting member with a single piece of wire arranged in a loop connected at each end to the mounting member. However, more typically the subassembly comprises a plurality of mounting members to increase the number of points at which the subassembly is mounted to the support structure and/or camera lens element. In this case, the subassembly may comprise a single piece of wire extending in a loop around the mounting members with the ends of the wire overlapping. Such a subassembly is convenient to facilitate manufacture.

On the other hand, the subassembly could alternatively consist of plural, separate pieces of wire connected between mounting members. In this case, part of the continuous loop may be formed by the mounting members rather than the wire itself.

Advantageously, the mounting members may be connected to the SMA wire by crimping the SMA wire. The use of crimps is advantageous because it is a convenient and effective method of connecting to SMA wire. Crimps also have the advantage of facilitating electrical connection to the SMA wire, where this is necessary. This is because the crimps formed in the mounting member(s) break through the naturally occurring oxide coating of the SMA wire.

Advantageously, in the step of assembling the subassembly into the camera lens actuation apparatus, the SMA wire is hooked over at least one retaining element of at least one of the support structure and the camera lens element so that the at least one retaining element holds the lengths of SMA wire extending from each side of the retaining element in tension. This provides the advantage of assisting in the adjustment of the length and tension of the lengths of SMA wire extending from each side of the retaining element, because the wire tends to slip into a balanced arrangement when it is hooked over the retaining element(s). This facilitates the production of an SMA arrangement with lengths and tension of SMA wire meeting the desired design constraints.

The camera lens actuation apparatus may include a suspension system arranged to provide biasing of the camera lens element relative to the support structure in an opposite direction along said movement axis from the tensional force applied by the at least one piece of SMA wire. In this case, the suspension system is enabled to perform not only the function of suspending the lens, but also the function of providing biasing against the SMA wire as part of the actuation function. This increases the compactness of the camera lens actuation apparatus.

In one particularly advantageous form, the suspension system comprises a plurality of resilient flexures coupled between the camera lens element and the support structure, the flexures being flexed to provide said biasing. This type of suspension system has the advantage of being intrinsically compact, as well as being simple and cheap to manufacture.

The use of a subassembly forming a continuous loop including the SMA wire also provides the advantage of facilitating manufacture of a camera lens actuation apparatus in accordance with the second aspect of the present invention described above.

One problem with the use of an SMA actuator is that the speed of cooling of the SMA material limits the speed of movement in the corresponding direction. Typically, the cooling occurs simply by natural transfer of heat from the SMA material to its surroundings. In the case of a camera lens element, this provides a particular problem that the speed of response of the actuation apparatus in the direction corresponding to cooling of the SMA material is limited. This impacts on the performance of the actuation apparatus. For example, in the case that the actuation apparatus is to be controlled by an autofocus algorithm which inevitably involves heating and cooling of the SMA material, this reduces the response time. It would be desirable to overcome this problem.

One solution is to implement some means for actively cooling the SMA material. However, this is difficult to achieve in practice.

According to the fourth aspect of the present invention, there is provided a camera lens actuation apparatus comprising:

a support structure;

a camera lens element supported on the support structure by a suspension system which guides movement of the camera lens element relative to the support structure along the optical axis of the camera lens element;

at least one length of SMA wire held in tension between the camera lens element and the support structure applying a tensional force having at least a component along the optical axis, wherein the at least one length of SMA wire has diameter of no more than 35 μm.

The fourth aspect of the present invention is based on the principle that the speed of cooling of the SMA wire can be reduced by using thin wire. In particular, it has been appreciated that use of SMA wire having a diameter of at most 35 μm provides an actuation apparatus with a sufficiently quick response time to allow implementation of an acceptable autofocus algorithm.

The fifth aspect of the present invention relates to a camera lens actuation apparatus in which a camera lens element supported on the support structure by a plurality of resilient flexures each extending around the optical axis to guide movement of the camera lens element along the optical axis of the camera lens element. Such a suspension system provides particular advantage in the case of a miniature camera in which driving of the movement is driven by at least one length of SMA wire held in tension between the camera lens element and the support structure. In this case, flexures are dual purpose, not only supporting the lens element but also providing biasing of the lens element relative to the support structure in an opposite direction along said optical axis from the tensional force applied by the SMA wire. Use of flexures also provides a suspension system which has the advantages of being compact and of providing the desirable mechanical characteristics of providing smooth travel without stiction but with low stiffness along the optical axis and high stiffness perpendicular to the optical axis.

With such a miniature camera, there is also a need for the apparatus to resist mechanical impacts without being damaged such that camera performance is subsequently harmed. The camera will be subject to a drop testing specification in manufacture and in use it may be accidentally dropped. Such mechanical impacts produce far greater forces on the camera lens apparatus than are experienced when the camera is held steady. In the case that the suspension system is formed by flexures it is necessary for the flexures to accommodate the displacement of the camera lens element caused by the external impact without that displacement causing permanent damage to the flexure, for example by exceeding the yield strain of the material of the flexure.

In respect of movement along the optical axis, it is generally straightforward to design flexures which can accommodate movement of a large degree along the optical axis as occurs due to mechanical impacts. This is because the flexures are designed to allow a large degree of movement in this direction. However, to meet their primary purpose of guiding movement along the optical axis, the flexures are designed to have high stiffness in respect of movement perpendicular to the optical axis. This makes it harder to design flexures which can resist mechanical impacts in this direction without permanent damage. The fifth aspect of the invention is concerned with measures which allow this requirement to be met.

According to the fifth aspect of the present invention, there is provided, a camera lens actuation apparatus comprising:

a support structure;

a camera lens element supported on the support structure by a plurality of resilient flexures each extending around the optical axis and coupled at one end to the camera lens element and at the other end to the support structure, flexing of the flexures guiding movement of the camera lens element relative to the support structure along the optical axis of the camera lens element;

at least one length of SMA wire held in tension between the camera lens element and the support structure applying a tensional force having a component along the optical axis, flexing of the flexures providing biasing of the camera lens element relative to the support structure in an opposite direction along said optical axis from the tensional force applied by the at least one length of SMA wire, wherein the support structure is arranged to limit the movement of the camera lens element radially of the optical axis and the flexures are curved along their length as viewed along the optical axis with at least three regions of alternating curvature.

The support structure limits the movement of the camera lens element radially of the optical axis. Such physical constraint using small clearances or stops is commonly used in other mechanical systems to limit displacement of components to a level where the systems are not damaged. However in the case of a miniature camera the nature of the flexures is such that the parts need to be positioned with a very small clearance, for example of the order of 50 μm or less. However, in practical terms this implies challenging manufacture and assembly tolerances, in fact to the degree likely to result in high cost parts and low manufacture yields.

This difficulty is reduced by the design of the flexures, in particular by the flexures being curved along their length as viewed along the optical axis with at least three regions of alternating curvature. This design allows the flexure to accommodate increased displacement radially of the optical axis without permanent damage. This is because the curvature accommodates the displacement by a degree of mechanical deformation whilst limiting the maximum bulk deformation in the flexure.

The sixth aspect of the invention is concerned with the compactness of a camera lens actuation apparatus which drives motion of a camera lens element using an SMA actuator.

According to the sixth aspect of the present invention, there is provided a camera lens actuation apparatus comprising:

a support structure;

an image sensor mounted on the support structure;

a camera lens element supported on the support structure by a suspension system which guides movement of the camera lens element relative to the support structure along the optical axis of the camera lens element, the camera lens element focusing light onto the image sensor; and an SMA actuator connected between the support structure and the camera lens element to drive said movement of the camera lens element relative to the support structure; and a drive circuit connected to the SMA actuator and capable of generating drive signals for driving of the SMA actuator, the drive circuit being mounted by the support structure to the rear of the image sensor.

When using an SMA actuator it is necessary to provide a drive circuit which is capable of generating drive signals for driving of the SMA actuator. Such a drive circuit will be of a size that is not insignificant relative to the size of the rest of the apparatus. Thus the drive circuit increases the size of the overall apparatus. However, by locating the drive circuit to the rear of the image sensor, it is possible to minimize the area of the camera apparatus as viewed along the optical axis. It has been appreciated that in many applications this is advantageous because in terms of packaging various components within the device the area of the apparatus is more important than the depth of the apparatus along the optical axis. Thus this design effectively improves the ability to package the device.

The seventh aspect of the present invention relates to the control of a camera lens actuation apparatus employing an SMA actuator which is arranged to drive movement of a camera lens element along the optical axis to change the focus on an image sensor. In particular, the seventh aspect of the present invention is concerned with an autofocus algorithm by which the control can be provided automatically.

With respect to camera lens actuation apparatus employing technologies other than SMA, for example electric motors and piezoelectric actuators, techniques for providing autofocusing are known. In general terms, the required degree of focus is determined and the actuator is controlled accordingly.

One technique for determining the required degree of focus is to use information from a physical range finder, for example an ultrasonic range finder which might use a time-of-flight calculation or an infra-red range finder which might derive distance as the square root of the reflected luminance. However, in general terms, autofocusing based on information from a range finder has a limited accuracy.

An alternative way of determining the required degree of focus is to use the image signal output by the image sensor to determine a measure of the quality of focus of the formed image and to control the camera lens actuation apparatus based on the determined measure of the quality of focus in accordance with an algorithm for example to maximize the measure.

The seventh aspect of the present invention is concerned with an autofocusing technique which determines the quality of focus based on the image signal output by the image sensor and based thereon controls the focus by heating the SMA material by passing a current through the SMA material in order to drive movement of the camera lens element along the optical axis.

In the case of using an SMA material to drive movement of the camera lens element, there is a considerable problem of providing accurate, repeatable control. This results from hysteresis between the applied current and the actual position of the camera lens element. Whilst the change of length of the SMA material is dependent on the temperature, there are nonetheless problems in implementing the control. A first problem is that it is difficult to accurately determine the temperature which is dependent on not only the applied current passing through the SMA material but also on the cooling of the SMA material which occurs at a varying rate depending on the ambient conditions. Thus, the temperature cannot be accurately determined from the known applied current. A second problem is that even assuming hypothetically that there was accurate knowledge of the temperature, there is hysteresis in the variation of the length of the SMA material and the temperature. In particular, the active temperature range over which the material transforms from the martensite phase to the austenite phase during heating occurs at a higher temperature than the temperature range over which the SMA material transforms from the austenite phase to the martensite phase during cooling. As a result of this hysteresis, after a cycle of heating and cooling the SMA material it becomes difficult to know the current state and hence length of the SMA material itself.

Whilst such problems with the control of SMA material are in general terms known, the problems are particularly acute where the SMA material is used to drive movement of a camera lens element, particularly a miniature camera for example in which the lens(es) of the camera lens element have a maximum diameter of 10 mm. In this case, the resolution of the positional control must be very fine because the overall range of travel of the camera lens element is low and yet the lens element must be controlled to a high degree of accuracy to provide proper focusing.

The seventh aspect of the present invention is concerned with providing accurate autofocusing control of an SMA actuation arrangement for driving a camera lens element given these problems.

According to the seventh aspect of the present invention, there is provided a method of controlling a camera lens actuation apparatus comprising an SMA actuator arranged on heating to drive movement of a camera lens element along the optical axis to change the focus of the camera lens element on an image sensor, in which method heating of the SMA actuator is performed by passing a current through the SMA actuator, the method comprising:

an initial phase of heating the SMA actuator from the martensite phase to reach the active temperature region of the SMA actuator in which the SMA actuator transforms from the martensite phase to the austenite phase, a scan phase of heating the SMA actuator across the active temperature region, monitoring the quality of focus of the image signal output by the image sensor and storing the value of a measure of the resistance of the SMA actuator when the quality of focus is at an acceptable level, a flyback phase of cooling the SMA actuator into the martensite phase, a focusing phase of heating the SMA actuator, wherein, during the focusing phase, a measure of the resistance of the SMA actuator is derived, the current passed through the SMA actuator is varied with a feedback control technique which uses the measured resistance of the SMA actuator as a feedback signal to drive the derived measure of resistance to the stored value of the measure of resistance of the SMA actuator.

Further according to the seventh aspect of the present invention, there is provided a control system for an actuation apparatus which implements a similar autofocus cycle.

The seventh aspect of the present invention provides an autofocusing technique which allows the focusing of the camera lens element to be automatically controlled by reducing the problems discussed above. This is for the following reasons.

Firstly, the seventh aspect of the present invention utilizes the measured resistance of the SMA material as a measure of the length of the SMA material and hence the position of the camera lens element. In particular, during the focusing phase, a feedback control technique uses the measure resistance of the SMA material as a feedback signal to drive the measure of resistance to a stored value at which the quality of focus has been determined to be acceptable.

The use of resistance has a considerable advantage of being straightforward to implement by the provision of additional electronic components supplementing the control circuit needed to provide the current which heats the SMA material.

However, it has been appreciated that the resistance of the SMA material does not by itself provide an accurate measure of position because there is hysteresis between the measured resistance and the actual position. This problem of hysteresis has been overcome by use of a flyback technique. In particular the desired measure of the resistance of the SMA material when the quality of focus is at an acceptable level is determined during a preliminary scan phase, and the SMA material is returned to this stored value only after a flyback phase during which the SMA material is cooled to be returned to the martensite phase. Thus in both the scan phase and the focusing phase, the SMA material is heated from the martensite phase. As a result, the variation of the resistance of the SMA material varies with the length of the SMA material in the same repeated manner in the scan phase and in the focusing phase. Thus, the flyback technique makes it possible to return the camera lens element to the same position determined to provide an acceptable quality of focus during the scan phase.

The use of a feedback control technique during the focusing phase provides the advantage of allowing the control to take account of the cooling of the SMA material which is in general terms variable.

All the aspects of the invention have particular application to a miniature camera lens element which includes one or more lenses having a diameter of at most 10 mm. The various aspects of the invention and the features thereof may be used together in any combination to particular advantage.

To allow better understanding, embodiments of the present invention will now be described by way of non-limitative example with reference to the accompanying drawings, in which:

FIG. 4 is a perspective view of a subassembly of the first camera in a relaxed state;

FIG. 5 is a perspective view of the subassembly taut during manufacture;

Figure 1:
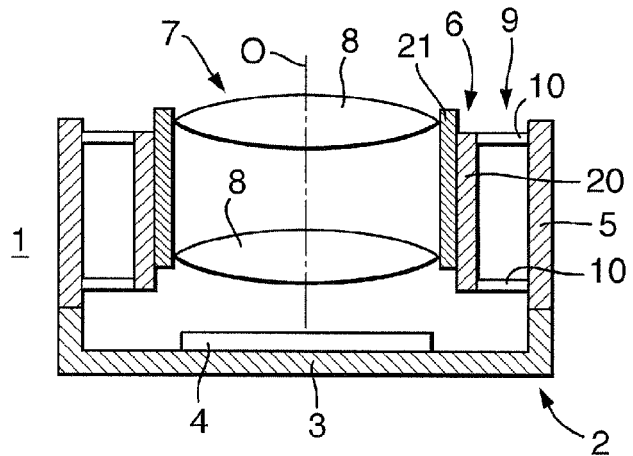
FIG. 1 is a schematic cross-sectional view of a first camera incorporating an SMA actuator.

A first camera 1 is shown schematically in FIG. 1. The camera 1 comprises a support structure 2 which has a base portion 3 on which there is mounted an image sensor 4 which may be CCD (charge-coupled device) or a CMOS (complimentary metal-oxide-semiconductor) device. The support structure 2 further comprises an annular wall 5 protruding from the front side of the base 3 on which the image sensor 4 is mounted. The support structure 2 may be made of plastic.

The camera 1 further comprises a lens element 6 which holds a lens system 7 consisting of one or more lenses 8. By way of example, the lens system 7 is shown in FIG. 1 as consisting of two lenses 8 but in general there may be a single lens 8 or plural lenses 8 as needed to provide the desired balance of optical performance and low cost. The camera 1 is a miniature camera with the lenses 8 of the lens system 7 typically having a diameter of at most 10 mm. Whilst the design of the camera 1 can be adapted for larger cameras it is particularly suitable for such a miniature camera.

The lens element 6 is arranged with the optical axis O of the lens system 7 perpendicular to the image sensor 4. In this manner, the lens system 7 focuses light onto the image sensor 4.

The lens element 6 is suspended on the support structure 2 by a suspension system 9 consisting of two suspension elements 10 connected between the annular wall 5 of the support structure 2 and the lens element 6. The suspension system 9 guides movement of the lens element 6 along the optical axis O. Such movement of the lens element 6 changes the focus of the image formed on the image sensor 4.

The detailed construction of the camera 1 will now be described with reference to FIG. 2 which is a detailed perspective view omitting the base 3 of the support structure 2. The camera 1 has a symmetrical arrangement such that the camera 1 looks identical when viewed from the opposite side from the view of FIG. 2.

The lens element 6 has a two-part construction comprising a lens carrier 20 and a lens holder 21 mounted inside the lens carrier 20 on an internal screw thread 22 formed inside the lens carrier 20. Typically the lens holder 21 has a diameter of 6.5 mm. Fixed to the lower rim of the lens carrier 20 is a metal ring 14 described further below. The lens carrier 20 is connected to the suspension system 9 to suspend the lens element 6. The lens holder 21 mounts the one or more lenses 8 of the lens system 7. Both the lens carrier 20 and the lens holder 21 may be made from moulded plastic.

Such a two-part lens element 6 provides advantages during manufacture. The camera 1 may be assembled by first mounting the lens carrier 20 without the lens holder 21 in place and only subsequently mounting the lens holder 21 after all the various connections to the lens carrier 20 have been made. By use of the screw thread 22, it is possible to adjust the position of the lens system 7 along the optical axis O relative to the carrier 6 and hence relative to the image sensor 4. Such adjustment is made during assembly in order to accommodate any variations in the focal lengths and relative positions of the lenses 8 in the lens system 7 arising due to manufacturing tolerances. Thereafter, the lens system 7 remains fixed in the same position relative to the lens carrier 20.

The suspension system 9 for the lens element 6 will now be described in detail. The suspension system 9 comprises two suspension elements 10 each formed from a respective single sheet of material such as steel or beryllium copper cut into shape. One possibility is hard rolled grade 302 austenetic steel which has the advantage of providing a high yield stress. The suspension elements 10 are mounted at opposite ends of the carrier 20. Whilst only one of the suspension elements 10 is clearly visible in FIG. 2, both suspension elements 10 have an identical construction, as follows.

Each suspension element 10 comprises an inner ring 11 connected to the lens carrier 20. In particular, the inner ring 11 is connected to a respective end surface of the lens carrier 20 so that it extends around the outer circumference of the lens holder 21.

Each suspension element 10 further comprises an outer ring 12 connected to the support structure 2. In particular, the outer ring 12 extends around and is connected to the end surface of the annular wall 5 of the support structure 2.

Lastly, each suspension element 10 comprises four flexures 13 which each extend between the inner ring 11 and the outer ring 12. Thus the flexures 13 are coupled at opposite ends to the lens element 6 and the support structure 2. As viewed along the optical axis O, the flexures 13 are inclined relative to the direction radial of the optical axis O. Thus the flexures 13 extend around the optical axis. The flexures 13 are disposed around the lens carrier 20 at different radial positions with rotational symmetry around the optical axis O. Furthermore, the flexures 13 have a thickness along the optical axis O (that is the thickness of the sheet of material from which the suspension element 10 is made) which is smaller than their width in a direction perpendicular to the optical axis O. The flexures 13 are also curved along their length as viewed along the optical axis O, this point being discussed in more detail below.

The two suspension elements 10 suspend the lens element 6 on the support structure 2 by means of the flexures 13 being coupled between the lens element 6 and the support structure 2. Due to their configuration, the flexures 13 accommodate movement of the lens element 6 along the optical axis O by flexing or bending. When the lens element 6 moves along the optical axis O, the inner rings 11 move along the optical axis O relative to the outer rings 12 with consequent bending of the flexures 13.

As the flexures 13 have a thickness parallel to the optical axis O which is smaller than their width, the flexures 13 are more compliant to bending in their thickness direction than to bending in their width direction. Accordingly, the flexures 13 provide the suspension system 9 with a lower degree of stiffness against movement of the lens element 6 relative to the support structure 2 along the optical axis O, than against movement of the lens element 6 relative to the support structure 2 perpendicular to the optical axis O.

Furthermore, the two suspension elements 10 are spaced apart along the optical axis O and thus the resistance to movement of the lens element 6 perpendicular to the optical axis O also provides resistance to tilting of the lens element 6.

Such resistance to off-axis movement and tilting of the lens element 6 is desirable because such off-axis movement and tilting can degrade the optical performance of the lens system 7 in focusing an image on the image sensor 4.

Figure 3:
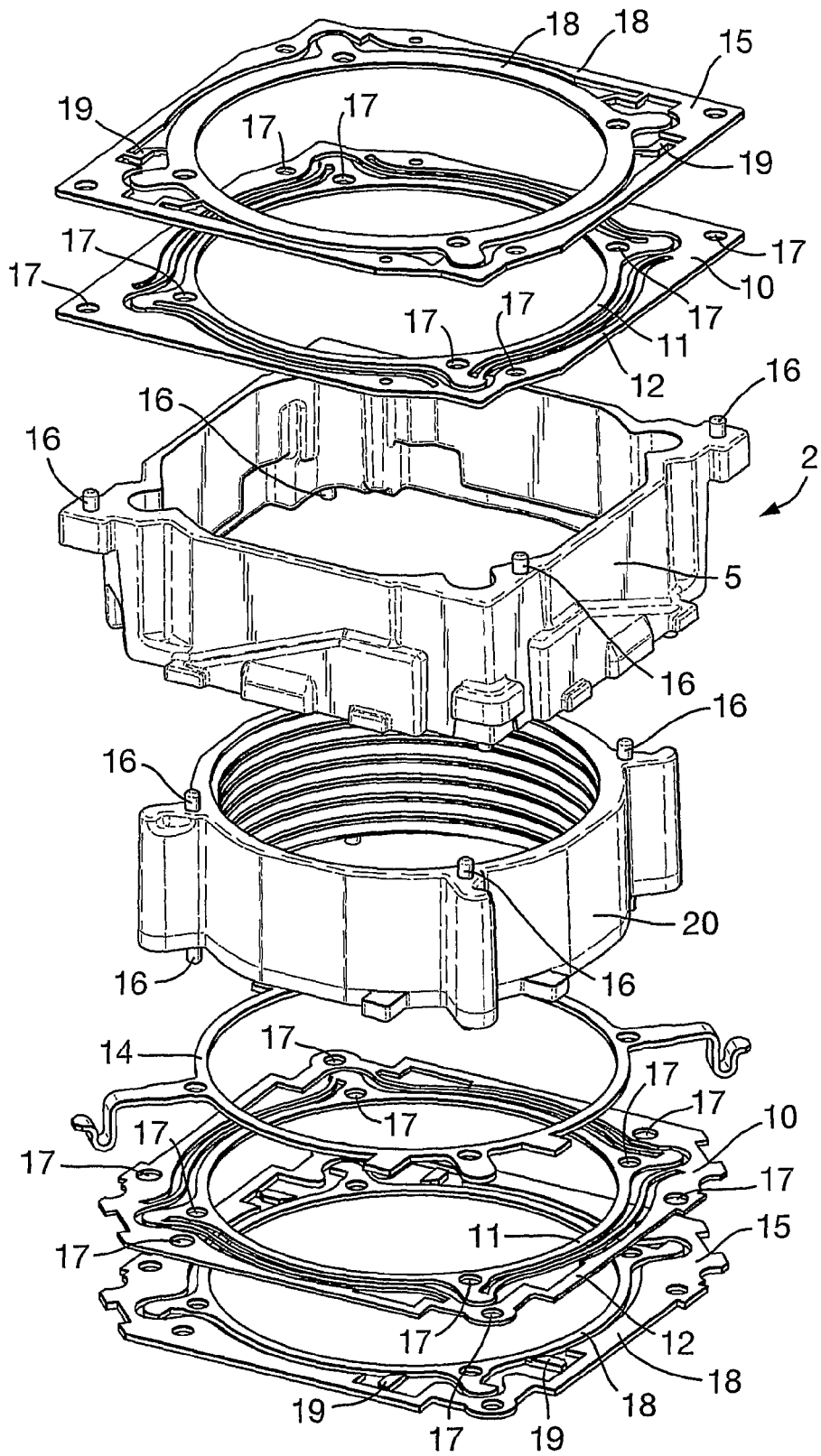
FIG. 3 is an exploded perspective view of part of the first camera.

The support structure 2, lens carrier 20 (including the metal ring 14), the suspension elements 10 and two stiffener elements 15 are manufactured as a subassembly as will now be described with reference to FIG. 3. These components are arranged in a stack as shown in FIG. 3. Location pins 16 formed on the support structure 2 and the lens carrier 20 locate in apertures 17 formed in the suspension elements 10. While the complete stack is compressed in a jig, adhesive is dispensed onto the ends of each of the location pins 16, both on the top and bottom of the stack. The preferred adhesive is a cyanoacrylate that is also UV curable. By capillary action the adhesive soaks around the location pins 16, and bonds the different layers to the support structure 2 and the lens carrier 20. Once the adhesive has cured, the subassembly can be removed from the jig. As an alternative to adhesive, it is possible to form the joints be heat staking the location pins 16 to form a plastic head that retains the parts mechanically.

Each stiffener 15 comprises two rings 18 which respectively conform to, and stiffen, the inner ring 11 and the outer ring 12 of a suspension element. The two rings 18 are joined together by sprues 19 which are removed only after the subassembly has been assembled. The use of the sprues 19 helps assembly in terms of jigging the rings 18 of the stiffeners 15, and reduces the component count, and hence part cost. Once the sprues 19 are removed, the lens carrier 20 can be moved upwardly relative to the support structure 2 by an external load.

In addition, the camera 1 comprises a subassembly 30 which is illustrated in isolation and in a relaxed state in FIG.

4. The subassembly 30 comprises a piece 31 of SMA wire arranged in a continuous loop with its ends 36 and 37 overlapping.

The subassembly 30 further comprises two mounting members 32 and 33 each formed as an elongate piece of metal for example brass. The mounting members 32 and 33 are connected to the piece 31 of SMA wire by crimping. In particular, the ends of the mounting members 32 and 33 are each crimped over the piece 31 of SMA wire to form a respective crimp 34 and 35.

The first mounting member 32 is crimped over the overlapping ends 36 and 37 of the piece 31 of SMA wire, holding the ends 36 and 37 together. The second mounting member 33 is crimped to the mid-point of the piece 31 of SMA wire. Thus, the piece 31 of SMA wire and the two mounting members 32 and 33 together form a continuous loop which provided advantages during manufacture.

During manufacture, the subassembly 30 is made separately from the remainder of the camera 1. In particular, the subassembly 30 is manufactured by holding the mounting members 32 and 33 in place, as shown in FIG. 5, and then winding the piece 31 of SMA wire around the mounting members 32 and 33. During the winding, the piece 31 of SMA wire is held taut, that is without any slack. The tensional force in the wire may be low so that the piece 31 of SMA wire is not strained, although higher tensions could equally be used.

After the winding with the piece 31 of SMA wire maintained taut, the two mounting members 32 and 33 are crimped onto the piece 31 of SMA wire to form the crimps 34 and 35. The use of crimping provides a strong and convenient mechanical connection to the piece 31 of SMA wire. In addition, the crimps 34 and 35 break through the oxide coating of the piece 31 of SMA wire and therefore provide an electrical connection from the mounting members 32 and 33 to the piece 31 of SMA wire.

After connecting the mounting members 32 and 33 to the piece 31 of SMA wire by the crimps 34 and 35, the SMA wire can be released so that it is not taut. The subassembly 30 is then assembled into the camera 1 in the arrangement described further below.

During manufacture of the subassembly 30, the piece 31 of SMA wire may be wound around the mounting members 32 and 33 using known winding techniques. Such techniques may additionally involve the piece 31 of SMA wire being wound around formers constituting part of the winding apparatus. Such manufacture of the subassembly 30 in a dedicated process separate from the remainder of the camera 1 allows the tension and length of each half of the piece 31 of SMA wire on opposite sides of the two mounting members 32 and 33 to be accurately controlled. Similarly, the complexity of the overall assembly of the camera 1 can be minimized. Also, the manufacture of the subassembly 30 in a separate dedicated process facilitates the formation of the connection from the mounting members 32 and 33 to the piece 31 of SMA wire by the crimps 34 and 35.

The subassembly 30 is arranged within the camera 1 as follows. The two mounting members 32 and 33 are each mounted onto the outside of the annular wall 5 of the support structure 2. The mounting members 32 and 33 are fixed in place and the piece 31 of SMA wire is thereby connected to the support structure 2. As shown in FIG. 2, the mounting members 32 and 33 are mounted in recesses 40 provided in the annular wall 5, for example by adhesive, swaging of the wall 5 or some other means.

Furthermore, each half of the piece 31 of SMA wire between the two mounting members 32 and 33 is hooked over a respective retaining element 41 which is an integral part of the metal ring 14 fixed to the lens element 6 and protrudes outwardly of the lens element 6. Thus the two retaining elements 41 are electrically connected together through the metal ring 14 (although this is not essential). Metal is a suitable material for the retaining elements 41 as it withstands the heat generated in the piece 31 of SMA wire. The surface of the retaining element 41 in contact with the piece 31 of SMA wire may be curved to reduce the maximum curvature of the SMA wire.

In the camera 1, the mounting members 32 and 33 are positioned on diametrically opposite points around the optical axis O. Similarly, the two retaining elements 41 are positioned at diametrically opposite points on the optical axis O mid-way between the two mounting members 32 and 33. Further, the retaining elements 41 are arranged at a position along the optical axis O which is closer to the image sensor 4 than the crimps 34 and 35 of the mounting members 32 and 33 which hold the SMA wire. As a result, the piece 31 of SMA wire is held with four lengths 42 of SMA wire which are each part of the piece 31 of SMA wire extending between a respective pair of (a) one of the mounting members 32 and 33 and (b) one of the retaining elements 41, the lengths 42 being held at an acute angle to the optical axis O. Each adjacent pair of the lengths 42 of SMA wire are coupled to the lens element 6 or the support structure 2 at a common point, that is at the retaining element 41 or at one of the mounting members 32 and 33. The lengths 42 of SMA wire are held in tension in the camera 1 so that they apply a tensional force having a component along the optical axis O, in particular in a direction biasing the lens element 6 away from the image sensor 4.

In addition, each individual length 42 of SMA wire applies a tensional force having a component perpendicular to the optical axis O. However, the lengths 42 of SMA wire are held in a symmetrical balanced arrangement in which the lengths 42 of SMA wire are of equal length, are inclined at an acute angle relative to the optical axis O of the same magnitude and are alternately inclined upwardly and downwardly as viewed radially of the optical axis. In other words, one pair of opposed lengths 42 of SMA wire are inclined upwardly and with rotational symmetry about the optical axis O and similarly the other two opposed lengths 42 of SMA wire are inclined downwardly with rotational symmetry around the optical axis O.

As a result, the net forces applied by the lengths 42 of SMA wire are balanced, assuming an identical tensional force within each length 42 as will occur when the lengths 42 of SMA wire are each heated by a current of same value. Thus, the net forces provide no component of force along any direction perpendicular to the optical axis O. Similarly, the net forces provide substantially no torque around any axis perpendicular to the optical axis O and also no torque around the optical axis O itself. Of course, there may be some net force or torque due to manufacturing tolerances and so in this context the references to there being no net force means that the net force is at least an order of magnitude less than the net force along the optical axis.

This means that the arrangement of the lengths 42 of SMA wire create substantially no off-axis movement or tilting of the camera lens element 6. This in turn means that the suspension system 9 does not need to resist any such off-axis movement or tilting. This reduces the constraints on the suspension system 9 which need only therefore be designed to guide movement of the lens element 6 along the optical axis O by providing a lower degree of stiffness against movement along the optical axis O than against movement in perpendicular directions.

During manufacture, the assembly of the subassembly 30 into the camera 1 to provide the balanced arrangement of forces in the lengths 42 of SMA wire is straightforward due to the arrangement of the camera 1. In particular, the subassembly 30 is easily manipulated by handling of the mounting members 32 and 33. Similarly, the appropriate lengths and tensions of the lengths 42 of SMA wire is easy to achieve as a result of the hooking of the SMA wire over the retaining elements 41, because slippage over the retaining element 41 assists in achieving an equal tension in the lengths 42 of SMA wire on opposite sides of the single retaining element 41. Therefore the coupling between the SMA wire and the lens element 6 is reduced to simple mechanical joints which do not require good electrical performance. This type of arrangement removes some of the assembly tolerance constraints on the camera 1. If the SMA wire was terminated on the lens element 6 by a crimp, then due to natural assembly variation the length and tension of the lengths 42 of SMA wire would vary.

After the assembly is made and in equilibrium, the SMA wire can be held in place with a small amount of adhesive, to ensure retention on the retaining elements 41 during operation or drop testing. This may be done after cycling of the SMA wire to help eliminate assembly tolerances The most challenging part of the manufacture process is the assembly and joining of the SMA wire to the camera 1. There are three main issues, namely (1) control of SMA wire length, (2) making mechanical and electrical joints to the SMA wire, and (3) control of the assembled geometry in the camera 1. These issues have led to the development of the subassembly 30 including the SMA wire. The subassembly 30 may be manufactured and quality tested independently of the remainder of the camera 1. Joining the piece 31 of SMA wire electrically and mechanically connected to the mounting members 32 and 33 which are separately mounted to the support structure minimizes the complexity of the manufacturing issues.

When the SMA wire is in its hot state, and hence fully contracted, it is stiff, and hence virtually at its natural length, the force from the flexures 13 producing negligible wire strain. Therefore the position of the lens element 6 in this scenario is largely independent of the parameters of the flexures, and is highly dependent on the length of the lengths 42 of SMA wire. This length is a key control parameter which is straightforward to measure and hence control.

When in the cold state, the SMA wire is stretched by the flexures 13, and the stress-strain curve of the SMA wire is very flat meaning that the wire can be strained by a large amount without affecting the stress induced. Therefore in the cold state the position of the lens is largely independent of the wire length, and is largely dependent on the flexure stiffness. The stiffness of the flexures 13 can be measured at the assembly stage.

Therefore the actuator performance over its range of travel can be split into these two manufacturing control parameters of wire length and flexure stiffness. With the preferred assembly process as designed, each of these parameters can be separately tested and hence controlled. This has advantages for manufacturing yield and process control, both of which affect the cost of the product.

The operation of the camera 1 to drive movement of the lens element 6 along the optical axis O relative to the support structure 2 will now be described.

SMA material exhibits the phenomenon that its stiffness changes with temperature, this occurring due to a solid-state phase change. At lower temperatures in the range, the SMA material enters a martensite phase in which it has a relatively low stiffness. At higher temperatures the SMA enters an austenite phase in which it has a higher stiffness than in the martensite phase. Thus heating (or cooling) of the lengths 42 of SMA wire causes them to decrease (or increase) in length, if reacting against a load.

In the camera 1, the lengths 42 of SMA wire are arranged in tension providing a net tensional force along the optical axis O between the lens element 6 and the support structure 2 in a direction moving the lens element 6 away from the image sensor 4. This force acts against the biasing force provided by the suspension system 9 in the opposite direction along the optical axis O. The flexures 13 flex depending on the tensional force from the lengths 42 of SMA wire. The flexures 13 as manufactured are straight as viewed radially of the optical axis O. On flexing the flexures 13 remain generally straight although some slight curvature may be generated.

Since the stiffness of the suspension system 9 remains constant, during heating or cooling the change in stiffness of the lengths 42 of SMA wire with temperature causes the lens element 6 to move along the optical axis O to a new equilibrium position in which there is a balance between the bias forces produced by the suspension system 9 and the lengths 42 of SMA wire. Thus heating (or cooling) of the lengths 42 of SMA wire drives movement of the lens element 6 away from (or towards) the image sensor 4.

Therefore a significant aspect of the camera 1 is the use of suspension system 9 comprising the flexures 13 as a passive bias element. In particular the flexing of the flexures 13 provides biasing of the camera lens element 6 in an opposite direction from the tensional force applied by the lengths 42 of SMA wire. In other words the suspension system 9 provides two functions of both guiding movement of the camera lens element 6 and acting as a passive bias element for the lengths 42 of SMA wire.

The degree of displacement of the lens element 6 relative to the support structure 2 along the optical axis O is dependent on the stress developed within the lengths 42 of SMA wire and also on the acute angle of the lengths 42 of SMA wire with respect to the optical axis O. The strain which may be developed in an SMA wire is limited by the physical phenomenon of the phase change. By arranging the lengths 42 of SMA wire at the acute angles with respect to the optical axis O, the lengths 42 of the SMA wire change in orientation when they change in length, ie the acute angle with respect to the optical axis O increases. This effectively gears the movement so that the degree of displacement of the lens element 6 along the optical axis O is higher than the change in length of the lengths 42 of SMA resolved along the optical axis. The degree of gearing may be increased by increasing the acute angle between the lengths 42 of SMA wire and the optical axis O. In the camera 1 shown in FIG. 1, the acute angle is approximately 70° but in general the acute angle may be chosen depending on the desired range of movement of the lens element 6.

The amount of movement is determined by both the acute angle between the lengths 42 of SMA wire and the optical axis O, and the length of the lengths 42 of SMA wire. It is desirable to maximize these parameters. However, this increases the overall size of the camera 1 and so this must be balanced against the practical need to minimize the size of the camera 1. This balance is achieved by the specific arrangement of the lengths 42 of SMA wire in the camera 1, in particular by the lengths 42 of SMA wire being arranged at an angle of 90° relative to each other as viewed along the optical axis O. Thus the plane formed by two lengths 42 of SMA wire may be considered as being angled or inclined relative to the optical axis O. As viewed along the optical axis O each length 42 of SMA wire extends along one side of a square shape around the camera 1 without the lengths 42 of SMA wire protruding outwardly and thereby increasing the area of the camera 1 perpendicular to the optical axis O. This allows the lengths and acute angle for each length 42 of SMA wire to be increased to a maximum within the area on a respective side of the camera 1 as viewed radially of the optical axis. Thus a relatively high displacement of the lens element 6 is achieved with a relatively compact size of the camera 1.

Figure 6:
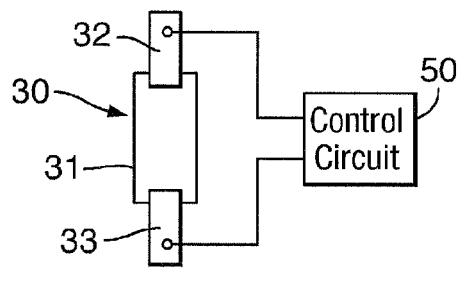
FIG. 6 is a diagram of the control circuit of the first camera.

The position of the lens element 6 relative to the support structure 2 along the optical axis O may be controlled by control of the temperature of the lengths 42 of SMA wire. In operation, heating of the lengths 42 of SMA wire is provided by passing a current therethrough which provides resistive heating. Cooling is provided by ceasing the current and allowing the lengths 42 of SMA wire to cool by conduction to their surroundings. The current is controlled by a control circuit 50 which is arranged as shown in FIG. 6.

The control circuit 50 is connected to each of the mounting members 32 and 33 which provide electrical connection to the piece 31 of SMA wire through the crimps 34 and 35. The control circuit 50 supplies a current between the two mounting members 32 and 33. The current therefore passes through each of the halves of the piece of SMA wire 31 connected between the mounting members 32 and 33 in parallel.

The nature of the control circuit 50 and the control effected thereby are described further below as it applies equally to further cameras which will be described below.

The first camera 1 has the particular advantage of being compact. This results from the compactness of the suspension elements 10 which form the suspension system 9, as well as from the compactness of the lengths 42 of SMA wire. This means that the camera 1 can be packaged very efficiently. Conversely the camera 1 can be designed with a lens element 6 including a lens system 7 in which the one or more lenses 8 have a relatively large diameter in relation to the footprint of the camera 1. For example, the first camera 1 can utilize lenses 8 with a maximum diameter of 6.0 mm in the case where the footprint of the camera fits into an 8.5 mm square. Typically, the design of the first camera 1 allows the outer diameter of the lens holder 21 to be at least 70% or 80% of the width of the footprint of the camera 1.

The material composition and pre-treatment of the piece 31 of SMA wire is chosen so that the phase change occurs at a temperature above the expected ambient temperature during normal operation. Typically, the temperature range is above 70° C. The material composition and pre-treatment of the piece 31 of SMA wire is further chosen so that the change between the martensite phase to the austenite phase occurs over as large a range of temperatures as possible. This is to maximize the degree of positional control.

It is noted that the lengths 42 of SMA wire are arranged to bias the lens element 6 away from the image sensor 4. This is advantageous because in the absence of heating of the lengths 42 of SMA wire, the lens element 6 is in its closest position to the image sensor 4 within its range of movement. The camera 1 is designed so that this position corresponds to far-field or hyperfocal focus, which is the most common setting for the camera 1, particularly if an auto-focus function is provided. In this way, the lengths 42 of SMA wire can remain unheated for the maximum possible time, thereby reducing power consumption. In addition, if the current supply from the control circuit 50 ceases to operate for any reason, the camera 1 is still operable in a fixed-focus mode which provides the widest possible range of focus positions.

Some considerations in the specific design of the suspension elements 10 and the lengths 42 of SMA wire are as follows.

High speed actuation of the lens element 6 is desired in many applications, for example if an auto-focus function is provided. The speed of response of the actuation is limited by the cooling of the lengths 42 of SMA wire. Whilst it is easy to heat the lengths 42 of SMA wire quickly by applying a current of high power, cooling of the lengths 42 of SMA wire occurs passively, that is simply by loss of heat to the surrounding air. Such cooling cannot be accelerated in a simple way. Whilst an active cooling means could be provided in principle, this is difficult to implement in practice.

However, the cooling may be speeded up by reducing the thickness of the lengths 42 of SMA wire. The thickness of the lengths 42 of SMA wire may be limited to a level at which heat transfer to the surrounding air occurs sufficiently quickly to provide a speed of response which is sufficiently quick for the particular application of the camera 1. For the size of cameras and wires under consideration, the cooling time changes approximately linearly with wire diameter. For this reason, it has been appreciated that the thickness of the lengths 42 of SMA wire is desirably at most 35 µm to provide a response which is acceptable for an auto-focus application of a camera. For example, in the above apparatus if the lengths 42 of SMA wire have a diameter of 25 µm the time for movement from close-focus to far-focus (i.e. the passive cooling cycle) is around 200 ms.

The suspension system 9 is designed with an appropriate number of flexures 13 of appropriate width, thickness and length to provide the desired degree of stiffness along the optical axis O and perpendicular thereto. The flexures typically have a thickness in the range from 25 µm to 100 µm. The number of flexures 13 may be changed by varying the number of flexures 13 within a suspension element 10 and/or by providing additional suspension elements 10. It is convenient that each suspension element 10 has a number of flexures 13 which is a multiple of four, with 4-fold rotational symmetry, because this allows for convenient packaging with the annular wall 5 of the support structure 2 having a square shape as viewed along the optical axis O.

In addition, the lengths 42 of SMA wire also provide stiffness along and perpendicular to the optical axis O. Although the thickness of the lengths 42 of SMA wire is constrained for cooling purposes as discussed above and the stiffness of the lengths 42 of SMA wire perpendicular to the optical axis O will generally be much less than the stiffness of the flexures, the lengths 42 of SMA wire may be considered as part of the suspension system 9 and their stiffness is taken into account in designing the camera 1.

Considering movement of the lens element 6 relative to the support structure 2 along the optical axis O, the total stiffness of the lengths 42 of SMA wire is desirably of the same order of magnitude as the total stiffness of the flexures 13 of the suspension system 9. Desirably, the total stiffness of the flexures 13 of the suspension system 9 has a value in the range from (a) the total stiffness of the lengths 42 of SMA wire experienced in the austenite phase of the SMA material to (b) the total stiffness of the lengths 42 of SMA wire experienced in the martensite phase of the SMA material. To achieve maximum lens displacement, the total stiffness of the flexures 13 of the suspension system 9 has a value equal to the geometric mean of (a) the total stiffness of the lengths 42 of SMA wire experienced in the austenite phase of the SMA material and (b) the total stiffness of the lengths 42 of SMA wire experienced in the martensite phase of the SMA material.

Again considering stiffness against movement of the lens element 6 relative to the support structure 2 along the optical axis O, it is desired that the total stiffness of the suspension system 9, provided by the sum of the stiffnesses of the flexures 13 and the lengths 42 of SMA wire, is sufficiently great to minimize the movement of the lens element 6 relative to the support structure 2 under gravity when the camera 1 changes between orientations with the optical axis O parallel and anti-parallel to the earth's gravitational field. This is to minimize the movement of the lens element 6 when the camera 1 is pointed in different directions as occurs during normal usage. For typical lens systems the movement of the lens element 6 relative to the support structure 2 is desirably limited to at most 50 μm. For a typical miniature camera this means that the overall stiffness of the suspension system provided by the combination of the flexures 13 and the lengths 42 of SMA wire should be at least 100 N/m, preferably at least 120 N/m.

Furthermore, the flexures 13 are designed with an appropriate width to provide the desired stiffness against movement of the lens element 6 relative to the support structure 2 in directions perpendicular to the optical axis O. The stiffness of the lengths 42 of SMA wire are also taken into account but usually provides a smaller contribution than the flexures 13 due to the large width of the flexures 13. The desired stiffness depends on the nature of the lens element 7, in particular the extent to which the lens element 7 can accommodate off-axis motion and tilting.

Another design consideration is to ensure that the maximum stress experienced by the flexures 13 and the lengths 42 of SMA wire do not over-stress the respective materials.

By way of example, one design case is as follows. Each suspension element 10 includes three flexures 13 (rather than four flexures 13 as shown in FIG. 2) each of length 4.85 mm, width 0.2 mm and thickness 50 μm. The piece 31 of SMA wire has a diameter of 25.4 μm which allows cooling of the SMA material in air from fully austenitic to fully martensitic in approximately 0.2 s when the environment is at room temperature. The lengths 42 of SMA wire are inclined at 60° to the optical axis O, that is each length 42 of SMA wire has a horizontal length (perpendicular to the optical axis O) of 5 mm, and a vertical height (parallel to the optical axis O) of 3 mm. When the SMA material is in the austenite phase, the suspension elements 10 is deflected by 0.5 mm. In this state, the six flexures 13 provide a combined force in the optical axis direction of 138 mN (pulling the lens element 6 towards the image sensor 4) in equilibrium with the lengths 42 of SMA wire. At this deflection, the flexures 13 have a maximum stress of 1 GPa. In this state, the SMA material has a tensile stress of 132 MPa, which is close to the highest allowable stress associated with a long fatigue life (millions of cycles). When the SMA material is in the martensite phase, the lengths 42 of SMA wire are stretched by approximately 3% and the flexures 13 are deflected by only 0.2 mm, meaning that the travel of the lens element 6 is 0.3 mm. The stress in the flexures 13 is now 380 MPa, and the stress in the SMA material is 47 MPa.

Figure 2:
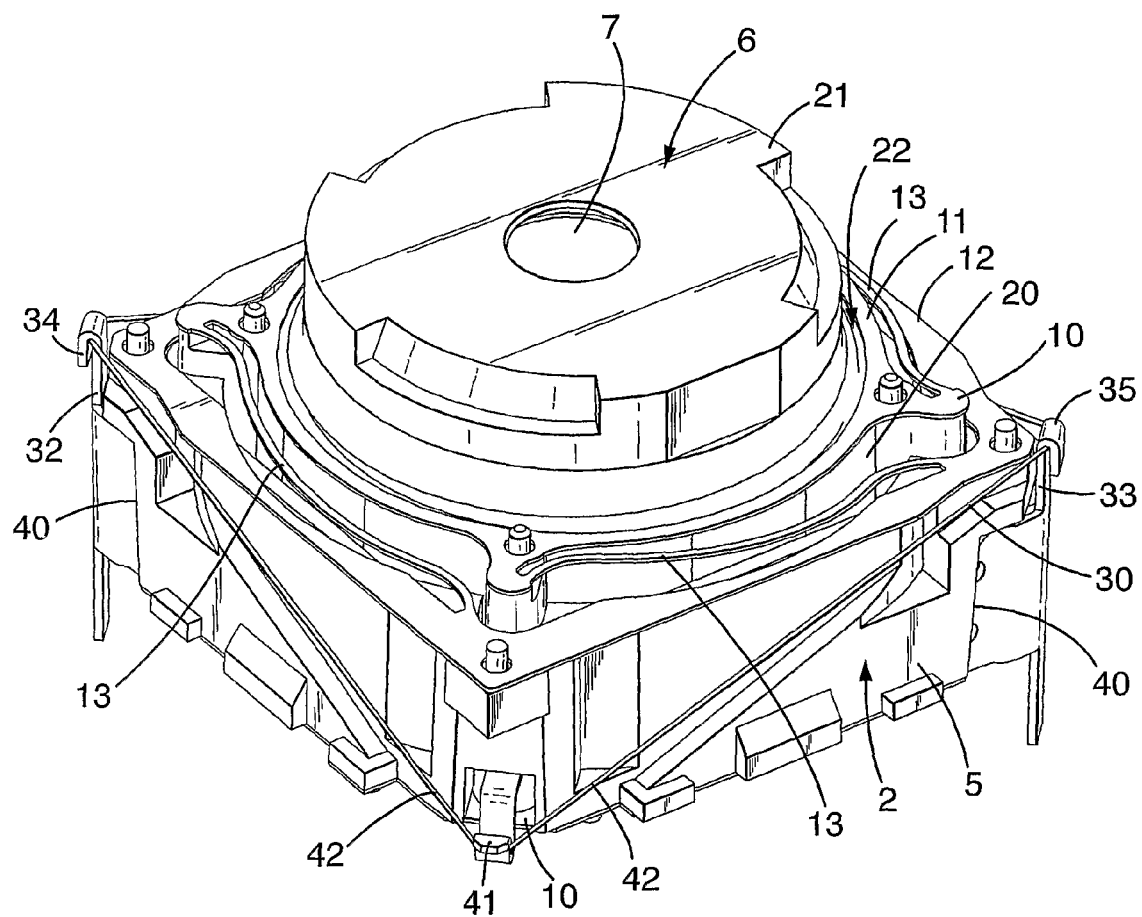
FIG. 2 is a detailed perspective view of the first camera.

There will now be described the curved shape of the flexures 13 as shown in FIG. 2. The purpose of the curved shape of the flexures 13 is to allow the camera 1 to resist mechanical impacts without being damaged such that camera performance is subsequently harmed. In particular, it is necessary for the suspension system 9 to accommodate the displacement of the lens element 6 caused by the impact without causing permanent damage to the flexures 13, for example by exceeding the yield strain of the material of the flexure 13. In the case of mechanical impacts causing the lens element 6 to move along the optical axis O, this is straightforward because the suspension system 9 has a low stiffness and is designed to accommodate large degrees of displacement. However in the case of mechanical impacts causing the lens element 6 to move radially of the optical axis O, the suspension system 9 is designed to have relatively high stiffness to resist off-axis displacement and tilt. This makes the flexures 13 more likely to be damaged by a displacement in this direction. In order to achieve a high planar stiffness, the flexures 13 should be as short as possible with a minimum of curvature, although reducing the length of the flexures 13 increases the axial stiffness, so there is a balance here. However by minimizing the curvature of the flexures 13 so that it is straight or follows a gentle curve around the optical axis O, the flexures 13 tend to buckle, stretch and plastically deform at areas of stress concentration at the joints with the inner ring 11 and outer ring 12. Due to an imbalance of system forces, there are areas of stress concentration at these joints.

To limit the displacement in this direction, the camera 1 is provided with a small clearance between the lens element 6 and the wall 5 of the support structure 2. In this way the wall 5 of the support structure 2 acts as a stop to limit the maximum displacement radially of the optical axis O. However, the small degree of clearance, for example of the order of 50 μm or less, presents challenging tolerances for the manufacture and assembly, in fact to the degree likely to result in high cost parts and low manufacture yields.

The flexures 13 have a curved shape to combat this problem. In particular, the flexures 13 are curved along their length as viewed along the optical axis. The flexures 13 have three regions of alternating curvature. By introducing such curvature to the flexures 13, a degree of strain relief is added to the structure. The tendency of the flexures 13 to plastically deform is reduced and instead the flexures 13 have a tendency to bend elastically. By introducing the outer regions having opposite curvature to the central region, the force imbalance is reduced and the stress developed at the joints with the inner ring 11 and outer ring 12 are reduced. Thus the flexures 13 become more compliant in the planar direction without experiencing material failure. This is achieved without an unacceptable compromise to the radial and axial stiffnesses.

To maximize this effect the three regions of the flexures 13 preferably have unequal lengths and curvature, in particular with the central region having a greater length and a lesser curvature than the outer regions. Advantageously, the central region has a length which is at least twice the length of the outer regions, for example with the ratio of the lengths of the three regions A:B:C being 1:2.5:1. Advantageously, the central region has a curvature which is at most half the curvature of the outer regions, for example with the ratio of length to curvature of each region being substantially the same so that the angles α, β and γ subtended by each region are substantially the same. However, this geometry for the curvature is not essential and benefit is still achieved with other geometries for example with other lengths and curvatures or with greater numbers of regions of alternating curvature.

Figure 7:
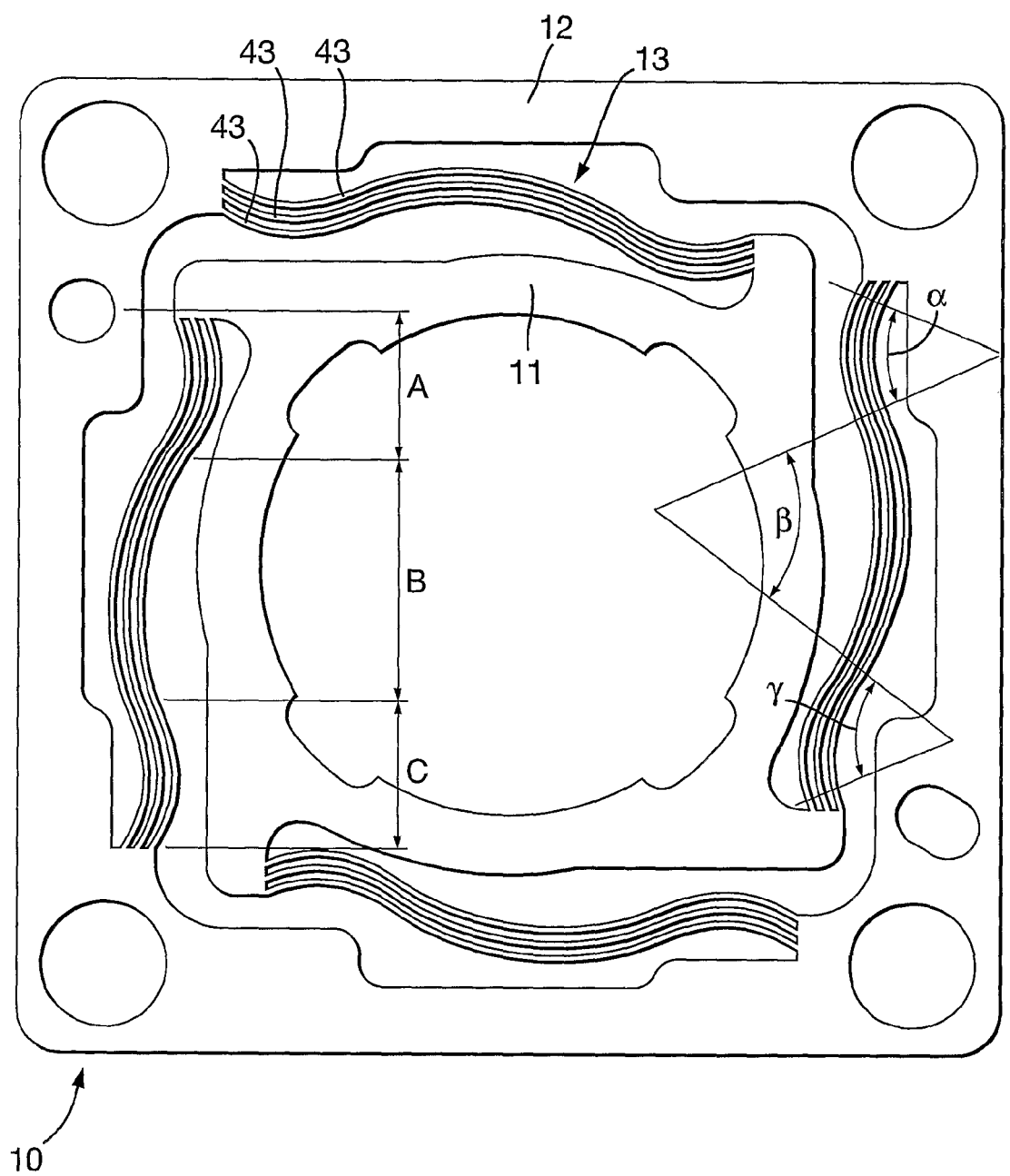
FIG. 7 is a plan view of a modified form of a suspension element in the first camera.

In the design of the suspension system shown in FIG. 2, each flexure 13 has a greater width radially of the optical axis O than thickness along the optical axis O. However FIG. 7 shows an alternative design for the suspension element 10 in which each flexure 13 is modified to consist of a group of parallel flexures 43. This allows the suspension system 9 to be made more compliant radially of the optical axis by reducing the width of each parallel flexure 43. This reduces the stresses in the parallel flexures 43 by reducing the distance of the extremities of material from the structure's neutral axis.

Reducing the width of a single flexure 13 would undesirably reduce the planar stiffness but the overall planar stiffness is maintained by introducing plural flexures 43 in parallel to one another, for example in proportion with the degree of width reduction. The practical limitation to this technique is the minimum width to which the parallel flexures 43 may be manufactured. This is considered to be currently around 50 μm. Although three parallel flexures 43 are shown, in general any number may be used.

Figure 8:
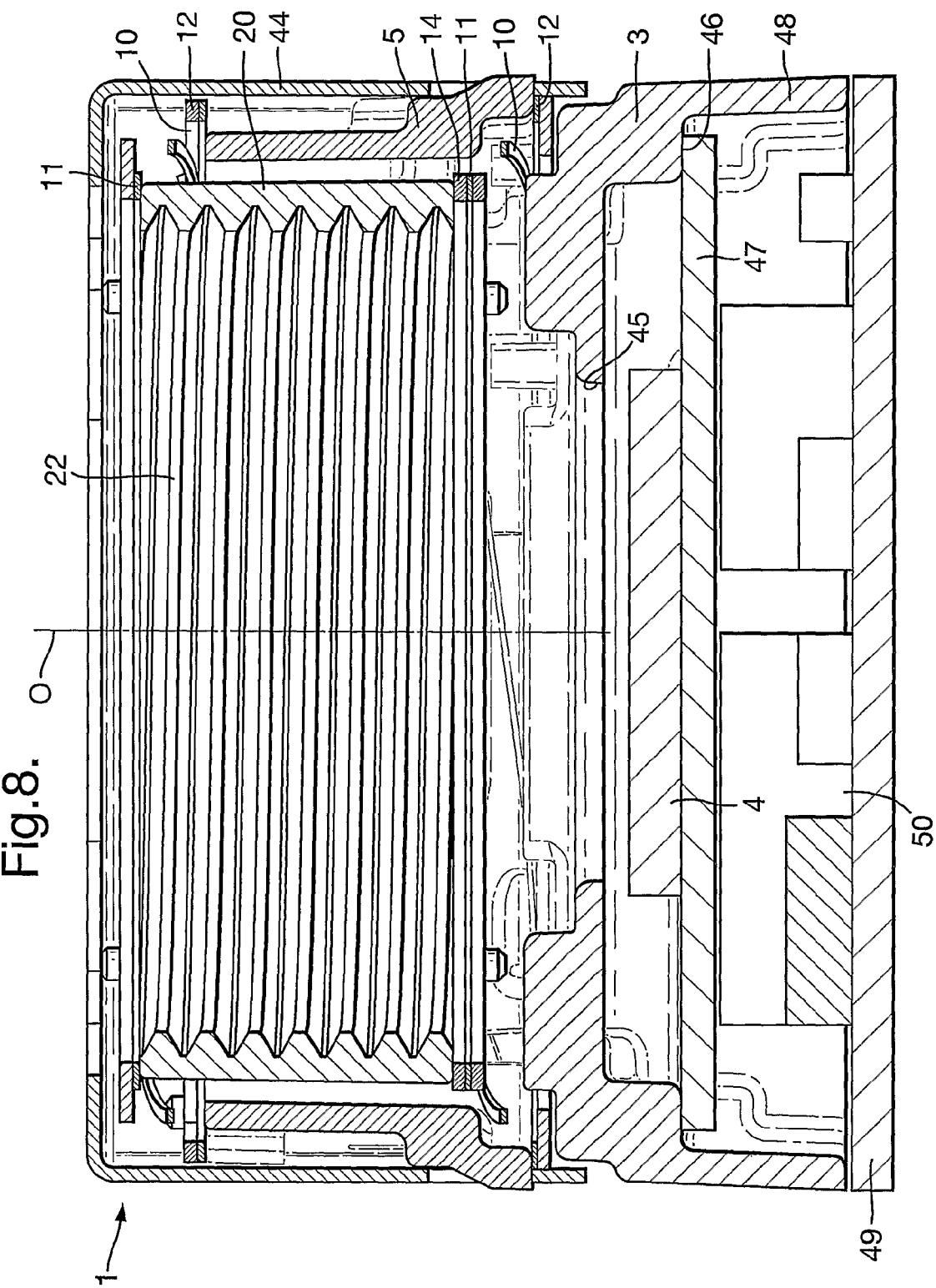
FIG. 8 is a detailed cross-sectional view of the first camera.

FIG. 8 shows in detail the camera 1 in its entirety except omitting the lens holder 21 for clarity. In this configuration (after fitting of the lens holder 21), the camera 1 is complete and is able to pass all customer reliability and strength tests. The additional components of the camera 1 beyond those shown in FIG. 2 will now be described.

The camera 1 has a screening can 44 clipped and bonded over the wall 5 of the support structure 2. The wall 5 is also bonded to the base 3 of the support structure 2. In the direction along the optical axis O, there are clearances between the lens element 6 and the screening can 44 and between the lens element 6 and the base 3 which allow sufficient movement of the lens element 6 along the optical axis O to provide for focusing of the image on the image sensor 4 whilst preventing a degree of movement which would damage the suspension system 9 or the lengths 42 of SMA wire.

In fact the base 3 has a more complicated construction than is shown schematically in FIG. 1. In particular the base 3 has a central aperture 45 behind which the image sensor 4 is mounted. For mounting of the image sensor 4, the base 3 has a ledge 45 formed to the rear of the aperture 45 and outside the area of the aperture 45. On the ledge 46 is mounted an image circuit board 47 on which the image sensor 4 is formed facing and aligned with the aperture 45 to receive light along the optical axis O.

Optionally the aperture 45 may have an infra-red filter fitted thereacross. Such a filter ensures unwanted radiation does not degrade the image quality, but also acts as a seal to prevent dust landing on the image sensor 4 degrading image quality. Therefore the base 3 can seal the image sensor 4 in an enclosure, this operation being performed in a high-grade clean room.

The base 3 further includes a protruding wall 48 disposed outside the ledge 46 and protruding rearwardly. A drive circuit board 49 is mounted on the protruding wall 48 and the drive circuit 50 is formed on that drive circuit board. Thus the drive circuit 50 is located to the rear of the image sensor 4. This minimizes the area of the camera 1 as viewed along the optical axis O. In many applications this is advantageous because in terms of packaging various components within the device the area of the camera 1 is more important than the depth of the camera 1 along the optical axis O. For example, this configuration allows the camera 1 to be mounted inside an electronic device in a purpose-designed socket, which is typically mounted on the motherboard of the electronic device.

As an alternative, it is possible to use an image circuit board 47 which is double-sided, with the drive circuit 50 mounted on its underside. Such a configuration may have cost and assembly advantages, and indeed connectivity advantages.

Another alternative that minimizes the size of the electronics is to integrate the control circuit 50 into the same chip as the image sensor 4. This is convenient as the calculations needed for the auto-focus algorithm are similar to those already carried out on the image sensor 4 for other tasks. This is clearly dependent on the specific image sensor 4 used. Alternatively the same processing function could be carried out by another processor in the electronic device outside the camera 1, but already present for other purposes.

One problem with the arrangement shown in FIG. 2 in which all the lengths 42 of SMA wire are formed in the subassembly 30 from a single piece 31 of SMA wire is that any differences in the lengths of the two halves of the loop lead to differential resistance of the two halves. This leads to differential heating when they are driven with the same voltage. This can lead to unbalanced forces on the lens, and hence greater than optimal tilt of the lens element 6.

Figure 9:
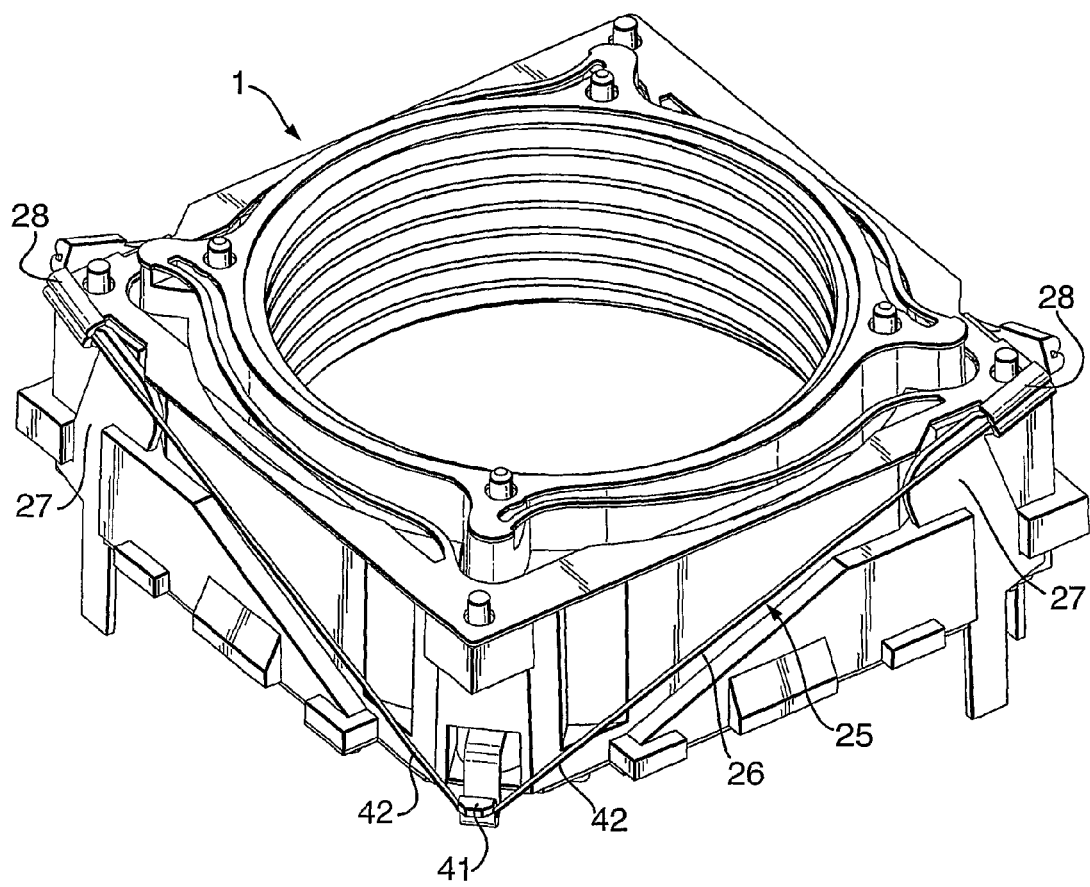
FIGS. 9 and 10 are perspective views of two modified forms of the first camera.
Figure 10:
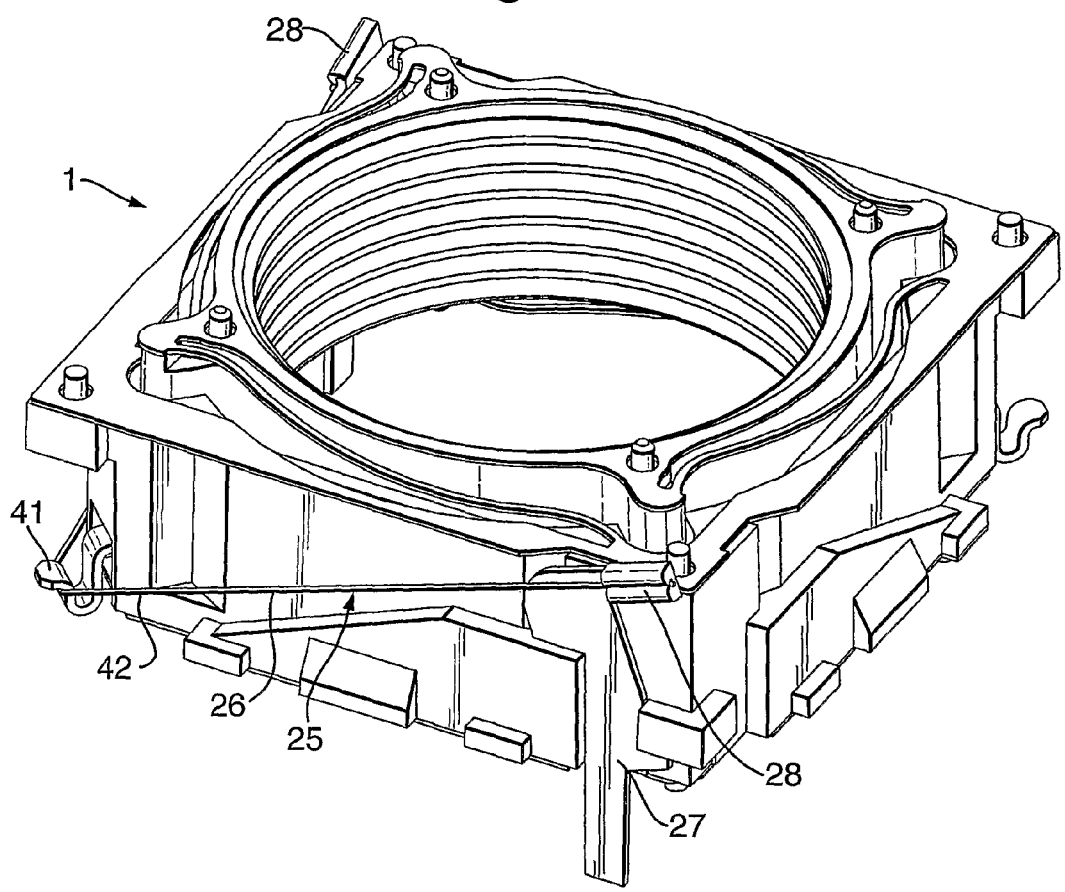

Two modified forms of the first camera 1 which deal with this problem are shown in FIGS. 9 and 10.

Figure 11:
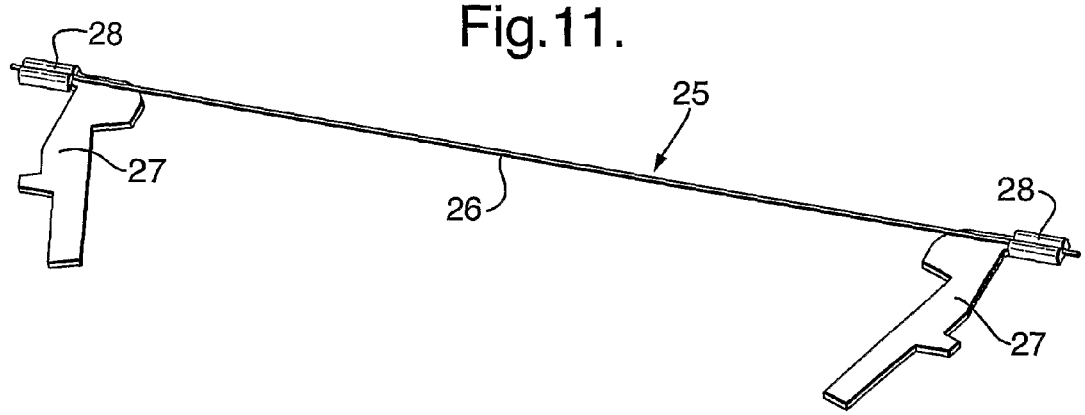
FIG. 11 is a perspective view of a subassembly in the modified forms of the first camera.

In the first modified form shown in FIG. 9, the single subassembly 30 is replaced by two separate subassemblies 25 as shown in FIG. 11. Each subassembly 25 comprises a piece 26 of SMA wire attached at each end to a mounting member 27 by a crimp 28. The subassemblies 25 are made separately from the remainder of the camera 1 which provides similar advantages to the subassembly 30 as described above. Using this geometry, the subassembly 25 can be formed without winding the wire. The two mounting members 27 can be mounted in a bandolier with the crimp machine setting the distance between the crimps 28 and hence the length of the piece 26 of SMA wire. The wire is laid across the two mounting members 27, and both crimps 28 are formed. The crimps 28 are formed using a standard W-shaped crimp tool.

The two subassemblies 25 are arranged within the camera 1 as follows to provide lengths 42 of SMA wire in substantially the same configuration as shown in FIG. 2. In particular the two subassemblies 25 are mounted on opposite sides of the camera 1 by mounting the mounting members 27 onto the outside of the annular wall 5 of the support structure 2. Furthermore, each piece 26 of SMA wire between the two mounting members 27 is hooked over a respective retaining element 41. Thus each half of the piece 26 of SMA wire forms a length 42 of SMA wire in substantially the same configuration as in FIG. 2. Therefore the first modified form of the camera 1 operates in the same manner as described above. However by forming the lengths 42 of SMA wire from two different subassemblies 25 the problem of differential heating discussed above is avoided.

There is now a choice about whether the two lengths 42 of SMA wire are electrically driven in series or in parallel. If the two lengths 42 of SMA wire are electrically driven in series this ensures that each length 42 of SMA wire sees the same heating current, and hence undergoes the same phase change.

The second modified form shown in FIG. 10 is the same as the first modified form shown in FIG. 9 except that only one subassembly 25 is provided. As a result the camera 1 has only one pair of lengths 42 of SMA wire. This configuration is not optimal in terms of performance, because the forces produced by the two lengths 42 of SMA wire are only partially balanced with a net force being developed radially of the optical axis O at the retaining element 41, this tending to tilt the lens element 6. However, in combination with a suspension system 9 having suitable flexures 13, the tilt of the lens element 6 is sufficiently small to be adequate for many lenses and image sensors. Conversely this design including a single subassembly 25 has advantages of reduced cost and assembly complexity.

An advantage to all the options described is that the SMA wire is not terminated on the lens element 6 which is the moving part of the camera 1. Instead the SMA wire is fixed only to the support structure 2 which is the fixed, non-moving part of the camera 1. This simplifies the geometry and features on the lens element 6 and both improves manufacturability and reduces the size of the camera.

Numerous variations to the design and manufacture of the subassembly 30 and the actuation arrangement in the camera 1 are possible. Some non-limitative examples which may be applied in any combination are as follows.

A first alternative is to change the number and/or arrangement of the lengths 42 of SMA wire around the lens element 6. In this case the lengths 42 of SMA wire desirably still provide the force balancing effect described above.

A second alternative is to change the number of mounting members 32 and 33 in the subassembly 30. It is possible to include only the first mounting member 32 which is connected to both ends 36 and 37 of the piece 31 of SMA wire to complete the loop. However this is less desirable as the mounting members 31 and 32 provide the advantages of facilitating handling and mounting of the subassembly 30 and also of facilitating making of electrical connections to the piece 31 of SMA wire. Conversely, additional mounting members may be provided. The mounting members 32 and 33 may be connected to either the lens element 6 or the support structure 2. The additional mounting members may be mounted to the lens element 6 instead of looping the piece 31 of SMA wire over the retaining elements 41.

A third alternative is for the SMA wire to be connected to the mounting members 32 at separated locations instead of overlapping the SMA wire at the mounting member, for example in the manner in which ends 36 and 37 of the piece 31 of SMA wire are overlapped at the first mounting member 32. In this case the continuous loop is formed in the subassembly 30 both by the SMA wire and by the mounting members themselves.

A fourth alternative is to connect the SMA wire to the mounting members 32 and 35 by a technique other than crimping. One possibility is welding.

A sixth alternative is to omit the mounting members 32 and 33 and instead to weld the ends 36 and 37 of the piece 31 of SMA wire together to form a continuous loop of SMA wire. In that case, connection to the remainder of the camera 1 may be made by simply hooking the resultant loop of SMA wire over retaining elements on the lens element 6 and the support structure 2 so that the SMA wire is held in tension without making any mechanical fixing. The third camera described below is an example of this type of arrangement.

The suspension system 9 may also be modified. Various other forms of suspension system employing flexures are possible. Merely by way of example, one possibility is to use flexures which are curved out of the plane perpendicular to the optical axis O. In this case the passive bias spring flexures are straight in lie plane of the sheet material and during manufacture probably go through a stage where they are straight and flat, but in a subsequent manufacturing stage they are formed either elastically or plastically to take up a natural geometry in the camera that is no longer flat. An example of such flexures is described in GB-2,398,854. This added curvature or form provides slack in the flexure needed to resist plastic deformation during impact.

Some further cameras will now be described. The further cameras employ many components in common with the first camera 1. For brevity, common components will be given the same reference numerals and a description thereof will not be repeated.

Figure 17:
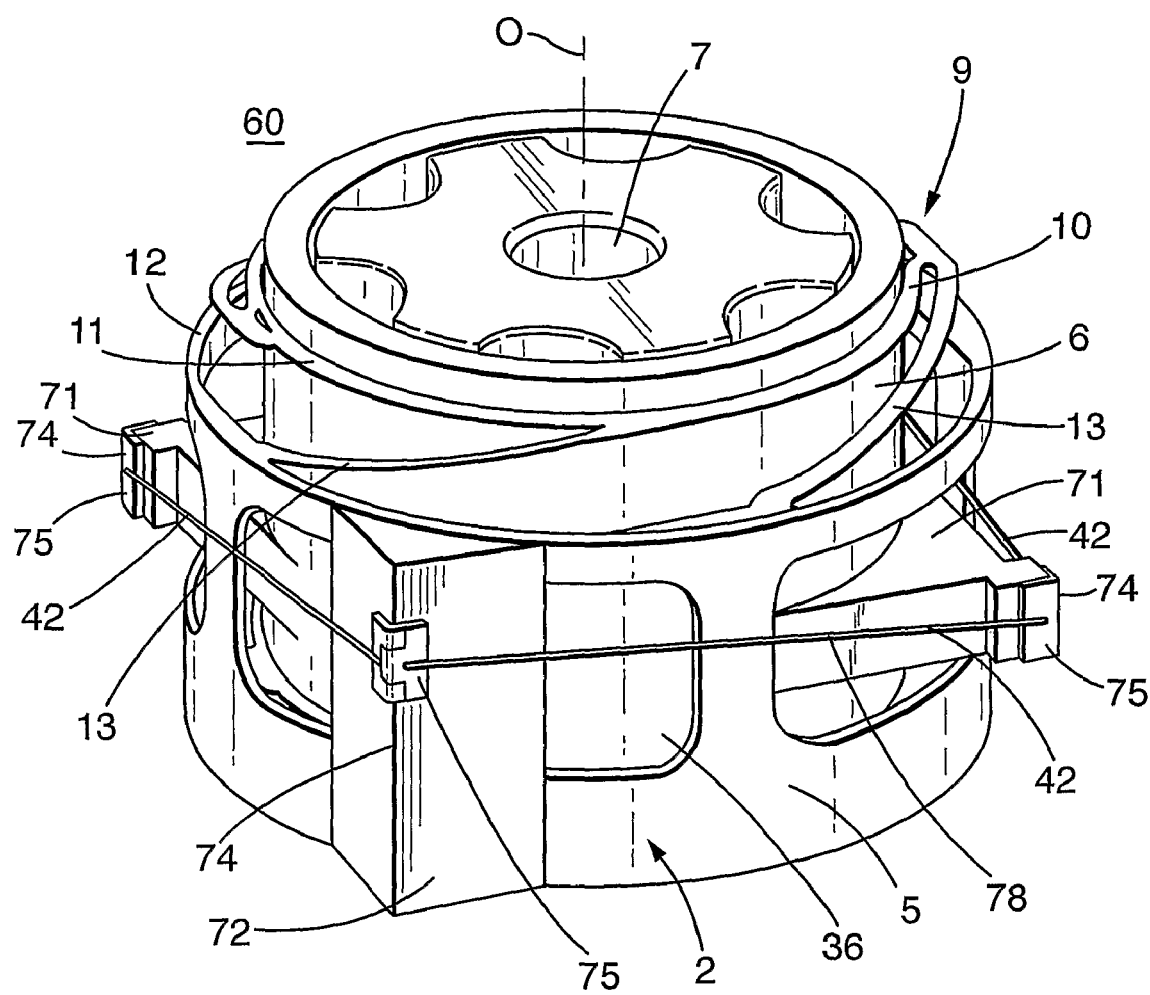
FIG. 17 is a perspective view of a second camera.

A second camera 60 is shown in FIG. 17. The second camera 60 has fundamentally the same construction as the first camera 1, including a lens element 6 suspended on a support structure 2 by a suspension system 9 comprising a pair of suspension elements 10.

The second camera 60 comprises four lengths 42 of SMA wire arranged in a similar configuration to the first camera 1. However, the lengths 42 of SMA wire are mounted to the lens element 6 and the support structure 2 in a different manner from the first camera 1, and in particular are not provided in a subassembly 30 as described above.

In particular, the lens element 6 has two mounts 71 protruding outwardly at opposite positions around the optical axis O. Similarly, the support structure 2 has two mounts 72 disposed at opposite positions around the optical axis O intermediate the mounts 71 of the lens element 6 and protruding outwardly from the outer side of the annular wall 5 of the support structure 2. Each of the mounts 71 and mounts 72 are formed with corners 74 at their radially outermost extremity.

Each length 42 of SMA wire is arranged between one of the mounts 71 and one of the mounts 72, extending through apertures 76 in the annular wall 5 of the support structure 2. Each length 42 of SMA wire is coupled to the corners 74 of the mounts 71 and 72 by respective clips 75.

The lengths 42 of SMA wire may each be part of a continuous loop 78 of SMA wire, for example formed by connecting together the ends of a piece 31 of SMA wire, preferably using welding. The welding may be YAG laser welding, which minimizes the material damage. The length of the loop 78 of wire is determined during the loop manufacturing process and thus does not need to be controlled during assembly of the second camera 60. This reduces manufacturing complexity. Formation of the SMA wire as a continuous loop 78 reduces the degree of fixing which needs to be provided by the clips 75 which in turn reduces the risk of damaging the SMA material of the wire.

Alternatively, as the clips 75 may fix each end of each length 42 of SMA wire, the lengths 42 of SMA wire may be separate pieces of SMA wire.

Electrical connection to the lengths 42 of SMA wire is made through any of the clips 75 but preferably the clips 75 on the mounts 72 of the support structure 2. The lengths 42 of SMA wire are arranged and operated in an identical manner to the first camera 1 as described above.

Figure 18:
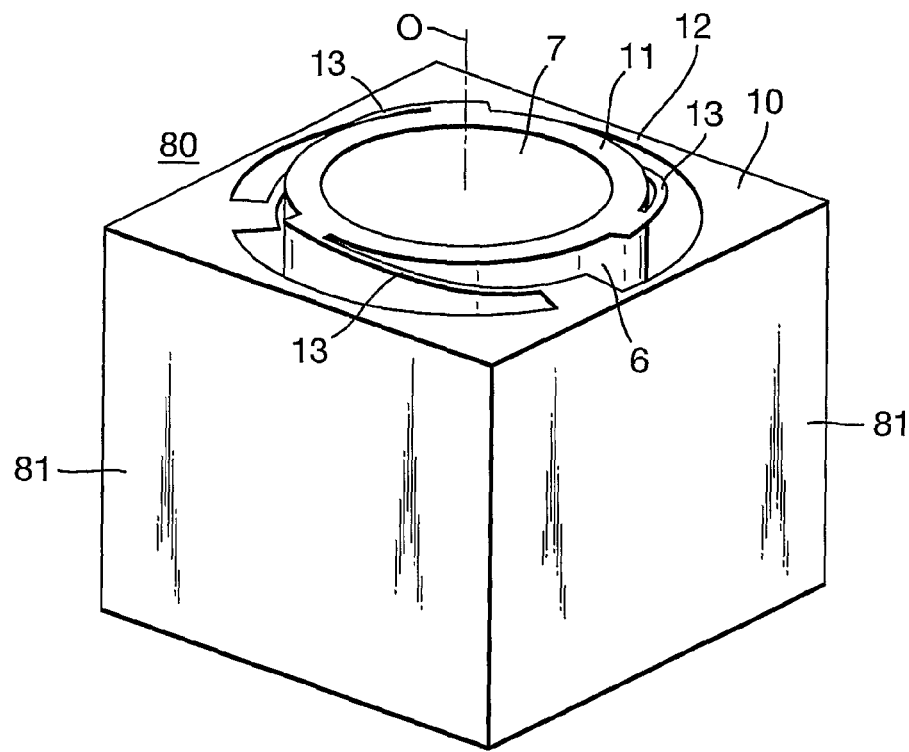
FIG. 18 is a perspective view of a third camera.
Figure 19:
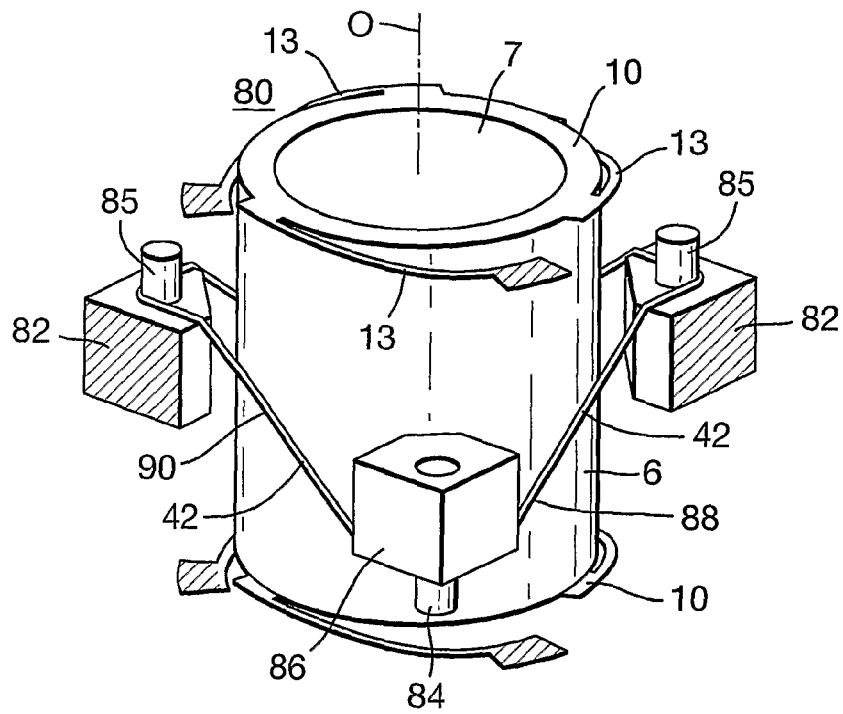
FIG. 19 is a perspective view of the third camera of FIG. 18 but with the support omitted to show the elements inside.

A third camera 80 is illustrated in FIGS. 18 and 19. The third camera 80 has the same construction as the first camera 1 with a lens element 6 suspended on a support structure 2 by a suspension system 9 comprising a pair of suspension elements 10. In this case, the annular wall 5 of the support structure 2 is formed as four planar walls 81 disposed around the lens element as can be seen in FIG. 18. The support structure 2 is omitted from FIG. 19 to show the internal elements.

The third camera 80 further comprises length 42 of SMA wire having a similar configuration to the first camera 1. However, in the third camera 80, the lengths 42 of SMA wire are parts of a continuous loop 88 of SMA wire which may be formed by connecting together the ends of a piece of wire, preferably using welding. As in the second camera 60, the welding may be YAG laser welding which minimizes the material damaged typically maintaining SMA properties at 80% of the unwelded material. The length of the SMA wire in the loop 88 is determined by the loop manufacturing process and thus does not need to be controlled during assembly of the third camera, this reducing manufacturing complexity.

For connecting the lengths 42 of SMA wire, the lens element 6 has two mounts 86 protruding outwardly at opposite positions around the optical axis O, and the support structure 2 has two mounts 82 disposed at opposite positions around the optical axis O and protruding inwardly from the inner side of the annular wall 5 of the support structure 2. The surfaces of the mounts 82 which are shaded in FIG. 19 are connected to the annular wall 5 of the support structure 2. The mounts 86 of the lens element 6 are closer to the image sensor 4 than the mounts 82 of the support structure 2. The mounts 86 of the lens element 6 each include a post 84 protruding parallel to the optical axis O towards the image sensor 4 and the mounts 82 of the support structure 2 each include a post 85 protruding parallel to the optical axis O away from the image sensor 4, so that the posts 84 and 85 protrude outwardly from the mounts 86 and 82.

The continuous loop 88 of SMA wire is looped around the mounts 81 and the mounts 82, that is under the mounts 81 and over the mounts 82. The posts 84 and 85 retain the wire 80 on the mounts 81 and 82 respectively, so that the lengths 42 of SMA wire are each formed by a portion of the loop 88 of wire extending between one of the mounts 81 and one of the mounts 82.

Due to the wire being a continuous loop 88 looped around the mounts 81 and the mounts 82, the lengths 42 of SMA wire are connected to the lens element 6 and the support structure 2 by being held in tension between the mounts 81 and 82 without the need to for any other form of connection between the SMA wire and the mounts 81 and 82, for example a crimping which has the risk of damaging the SMA material of the wire leading to cracking and material failure.

The posts 84 and 85 are made of a conductive material, typically a metal. Electrical connection to the lengths 42 of SMA wire is made through any of the posts 84 or 85 but preferably the posts 85 on the support structure 2. Due to the wire being a continuous loop 88 looped around the mounts 81 and 82, in principle a sufficient electrical contact between the wire 80 and the posts 84 or 85 may be made without the need for soldering the wire 80. However in practice the tension developed in the lengths 42 of SMA wire is relatively small and hence is not good at breaking through the oxide casing formed on the lengths 42 of SMA wire. To improve the electrical contact, it is possible to solder the lengths 42 of SMA wire to the posts 84 or 85, although this requires the use of aggressive solder fluxes to penetrate the oxide coating. Such soldering may have the undesirable affect of reducing the integrity of the lengths 42 of SMA wire, although this affect may be reduced by strain relieving the heat-affected zone around the soldering, for example using a technique such as potting the wire.

The lengths 42 of SMA wire are arranged and operated in an identical manner to the first camera 1 as described above.

Figure 20:
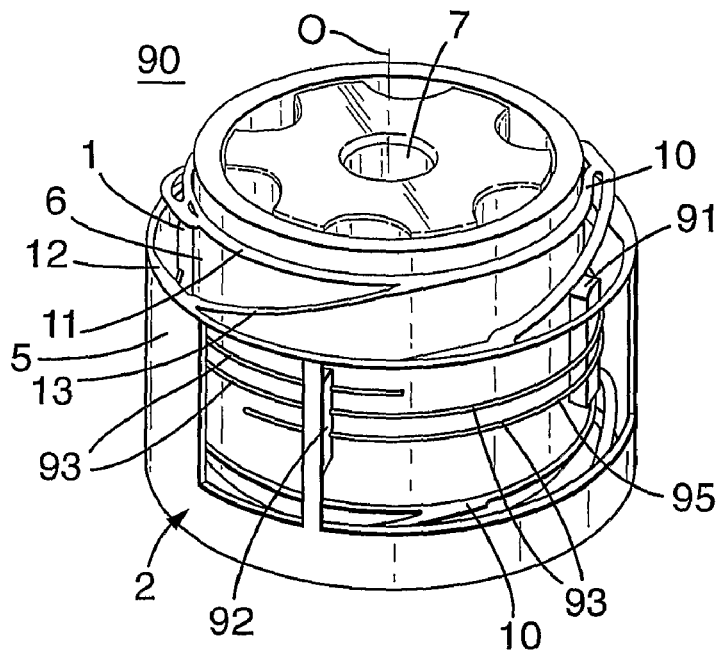
FIG. 20 is a perspective view of a fourth camera with the annular wall of the support structure shown cut-away and with a first alternative arrangement of SMA wire.
Figure 21:
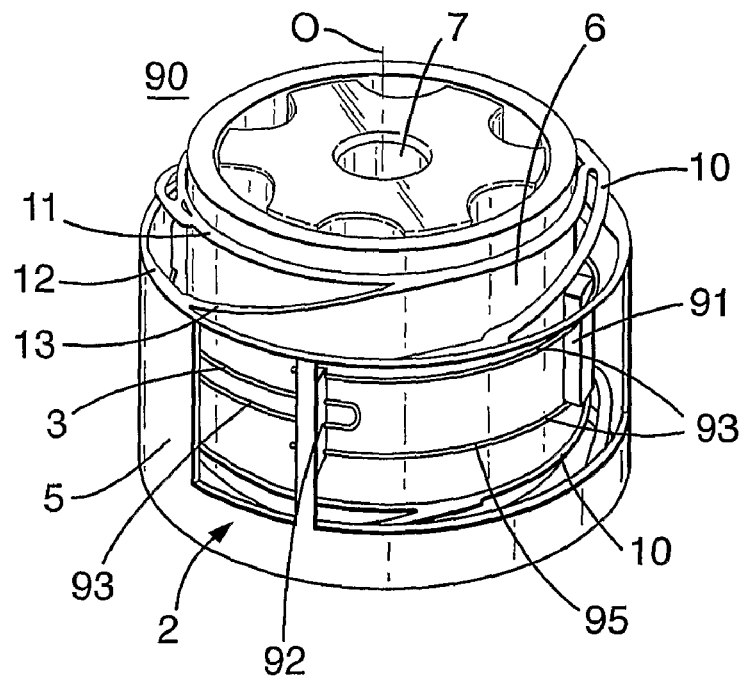
FIG. 21 is a perspective view of the fourth camera of FIG. 20 with the annular wall of the support structure shown cut-away and with a second alternative arrangement of SMA wire.

A fourth camera 90 is illustrated in FIGS. 20 and 21. The fourth camera 90 has a similar arrangement to the first camera 1 comprising a lens element 6 suspended on a support structure 2 by a suspension system 9 consisting of two suspension elements 10. However, in the fourth camera 90 the form of the SMA material used to drive movement of the lens element 6 is different from the lengths 42 of SMA wire in the first camera 1. In particular, the lengths 42 of SMA wire of the first camera are replaced by an SMA wire 95 which extends in a plurality of turns around the lens element 6.

There are two alternative arrangements for the SMA wire 95. In the first alternative arrangement shown in FIG. 20, the SMA wire 95 extends in a coil around the lens element 6. In the second alternative arrangement shown in FIG. 21, the SMA wire 95 extends in one complete turn around the lens element 6 and then reverses direction to extend in another complete turn around the lens element 6 in the opposite sense. Consequently the SMA wire 95 in the second alternative has two halves which extend around the lens element in opposite directions. This improves the electromagnetic compatibility of the fourth camera 90 because the induction in each half of the SMA wire 95 cancels out.

The lens element 6 is provided with two mounts 91 on its outer surface at opposite positions around the optical axis O and similarly the annular wall 5 of the support structure 2 is provided with two mounts 92 on its inner surface at opposite positions around the optical axis O intermediate the mounts 91 of the lens element 6. The mounts 91 and 92 are therefore disposed alternately around the optical axis O. The SMA wire 95 is coupled to each of the mounts 91 and 92 on each turn of the SMA wire 95. This has the result that each portion 93 of the SMA wire 95 coupled intermediate one of the mounts 91 and one of the mounts 92 constitutes a flexure which accommodates movement of the lens element 6 along the optical axis O by bending thereof.

The mounts 91 are displaced relative to the mounts 92 along the optical axis O in a direction towards the image sensor 4 so that the portions 93 of the SMA wire 95 are stressed to bias the lens element 6 along the optical axis O in a direction away from the image sensor 4. The flexures 13 of the suspension system 9 bias the lens element 6 in the opposite direction. Thus, in terms of the movement along the optical axis O, the wire 93 in the fourth camera 90 has the same function and effect as the lengths 42 of SMA wire in the first camera 1, even though the portions 93 of the SMA wire 95 act as flexures rather than being in tension. In operation, the temperature of the SMA wire 95 is controlled by passing a current therealong which drives movement of the lens element 6 in the same manner as in the first camera 1.

Figure 22:
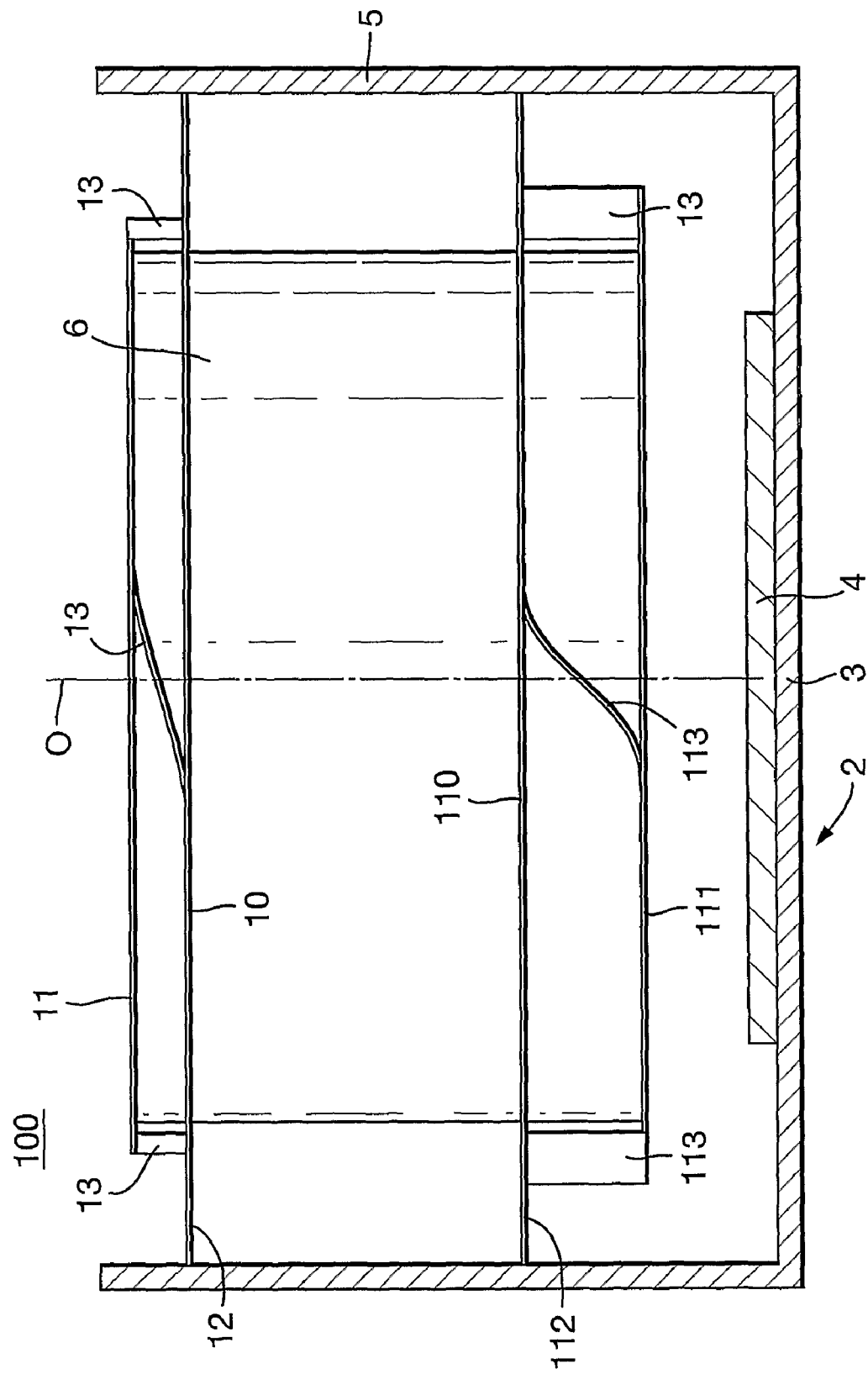
FIG. 22 is a side view of a fifth camera, the support being shown in cross-section.
Figure 23:
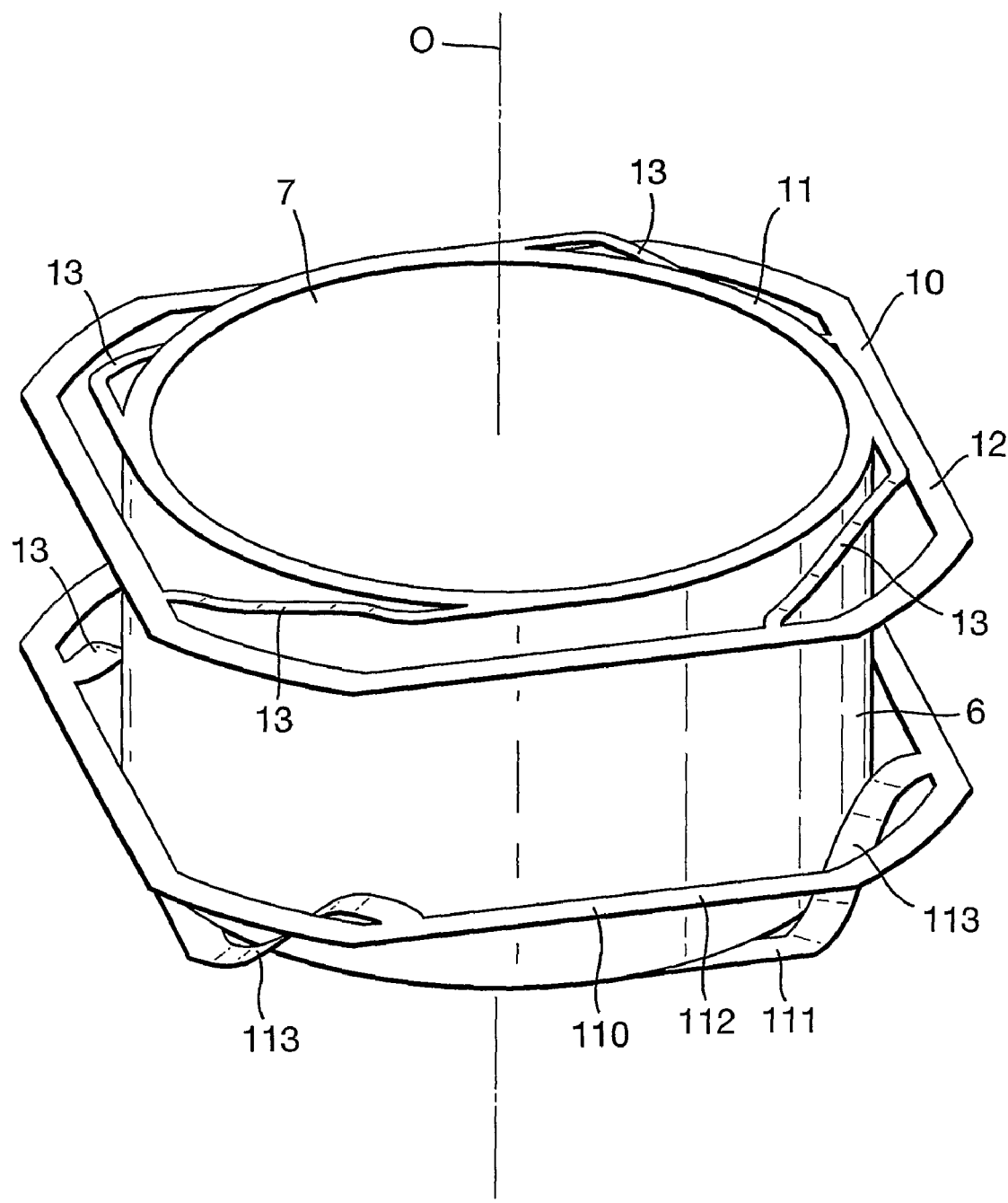
FIG. 23 is a perspective view of the fifth camera of FIG. 22, omitting the support structure.

A fifth camera is illustrated in FIGS. 22 and 23. In the fifth camera 100, the lens element 6 is suspended on a support structure 2 by a suspension system 9. The suspension system 9 comprises two suspension elements 10 and 110. One is a passive suspension elements 10 which is identical to the suspension elements 10 of the first camera 1. The other is an SMA suspension element 110 having an identical configuration to the suspension elements 10 of the first camera 1 but instead being made from SMA material rather than passive material. The SMA suspension element 110 has an identical form and construction to the passive suspension element 10 except that the difference in materials means that the flexures 113 of the SMA suspension element 110 may be sized differently to provide an appropriate stiffness. The passive suspension element 10 and the SMA suspension element 110 are connected to the lens holder 6 at opposite ends and hence guide movement of the lens holder 6 along the optical axis O in an identical manner to the suspension elements 10 of the first camera 1.

In the fifth camera 100, the passive suspension element 10 is mounted with the inner ring 11 and outer ring 12 relatively displaced on the optical axis O so that the flexures 13 are stressed by bending to bias the lens holder 6 along the optical axis O in a direction towards the image sensor. The SMA suspension element 110 is similarly mounted so that the flexures 113 are stressed by bending to bias the lens element 6 along the optical axis O, but instead in a direction away from the image sensor 4. In this manner, the position of the lens element 6 along the optical axis O is determined by the relative stiffness of the flexures 13 of the passive suspension element 10 and the flexures 113 of the SMA suspension element 110, and this position of the lens element 6 may be controlled by controlling the temperature of the flexures 113 of the SMA suspension element 110, which is achieved by passing a current there along. Thus, the control and effect of the fifth camera 100 is fundamentally the same as the first camera 1 with the SMA suspension element 110 acting in place of the lengths 42 of SMA wire.

Figure 12:
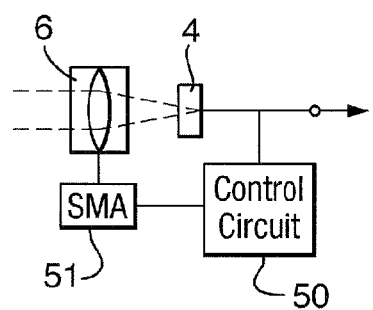
FIG. 12 is a diagram of the control electronics.

The nature of the control circuit 50 and the control effected thereby will now be described. A schematic view of the control circuit 50 is shown in FIG. 12. The control circuit 50 may be used with any of the cameras described above or indeed any SMA actuation arrangement. Accordingly the following description will refer generically to control of an SMA actuator 51 which may be any of the lengths 42 of SMA wire in the case of the first to third cameras, the loop of SMA wire in the case of the fourth camera or the flexures 113 of the SMA suspension system 9 in the case of the fifth camera. Thus in FIG. 12, the control circuit 50 is connected to the SMA actuator 51 and applies a current thereto to control the temperature of the SMA actuator 51 which moves the lens element 6 and changes the focus of the image formed on the image sensor 4.

The control circuit 50 controls the degree of heating of the SMA actuator 51 by controlling the current flowing through the SMA actuator 51, applying current to effect heating and ceasing (or reducing) the current flow to allow cooling.

This control may be based on a measure of the position of the lens element 6 output by a sensor.

Such a measure of the position of the lens element 6 may be a signal output by a position sensor, such as an optical sensor or an inductive sensor, which detects the position of the lens element 6 directly.

Alternatively, such a measure of the position of the lens element 6 may be the temperature of the SMA actuator 51 indicated by a signal derived by a temperature sensor.

Alternatively, such a measure of the position of the lens element 6 may be the resistance of the SMA actuator 51 indicated by a signal derived by a resistance sensor. The change results from the fact that the strain changes the length and area of the SMA actuator 51 sufficiently to overcome the contrary change in the resistivity of SMA actuator 51 in the martensite and austenite phases. As a result the resistance is effectively a measure of the change in length of the SMA actuator 51.

An optical or inductive position sensor is likely to be cheap and generally there is a low complexity of the processing circuit for the output signal. On the other hand, an optical or inductive sensor requires additional space, and in the case of an optical sensor leakage of light onto the image sensor 4 needs to be avoided. However, a resistance sensor does not increase the package size of the camera, because it is implemented merely by additional components in the control circuit 50.

The case of an optical sensor may be implemented by an optical transmitter and receiver arranged in a package disposed on the lens element 6 (or support structure 2) such that light from the transmitter is reflected off a target on the support structure 2 (or lens element 6) onto the receiver. The receiver detects the quantity of light which is received. For example the receiver may be a phototransistor in which light causes a current flow which with suitable external component choice creates a linear change in voltage. There are many choices of target and motion of target, which will produce a change in the light incident on the phototransistor, for example moving the target towards and away, sliding the target over the sensor, sliding a grey scale target, sliding a wedge shaped black/white transition target, sliding a white/black transition across the target, changing the angle of a reflector.

The case of an inductive sensor may be implemented using three inductors, arranged along the optical axis O, on one of the lens element 6 and the support structure 2, with their axes perpendicular to the optical axis O and with the centre inductor offset relative to the outer inductors. The centre inductor is driven, and the outer inductors receive an identical flux. A metal object, on the other of the lens element 6 and the support structure 2, moves across the inductors, destroying the symmetry, and thus causing an imbalance in the received flux in the outer inductors. By connecting the outer inductors in series but with opposite polarity, the imbalance is detected and the common mode identical signal is cancelled. This removes a large DC output from the sense technique. The output is then amplified, and rectified, just as an AM radio signal.

In contrast, a resistance sensor only requires electrical components connected to the SMA actuator 51, although it does require relatively complex processing to interpret the signal output.

The principle behind the use of resistance is as follows. The resistance of the SMA actuator 51 varies with temperature and with deformation. Outside the active temperature region in which deformation occurs, the resistance increases with temperature as is the case for conductors generally. Within the active temperature region, as the temperature increases, the SMA actuator 51 shrinks in length and the length change causes the resistance to decrease (as does fattening of the SMA material in accordance with the Poisson ratio). Therefore the resistance provides a measure of the length of the SMA actuator 51.

There are a number of techniques which may be applied in the control circuit 50 to make use of resistance measurements, for example as follows.

A first technique is to apply linear drive in which the control circuit 50 uses a current source which is controlled linearly with the desired degree of heating. For example, the current source may be a simple linear class B amplifier. In this case, the current and the voltage of the SMA actuator 51 are measured and used to derive the resistance. However, the need to measure voltage and current and to calculate the resistance increases the complexity of the control circuit 50, and the required divide may increase the latency of the feedback and possibly be a source of inaccuracy. The problems can be reduced but not removed altogether by using a constant-current or a constant-voltage current source.

A second technique is to use a linear drive with a superimposed small signal. The control circuit 50 uses a current source which is controlled linearly to output a linear drive signal to provide the desired heating.

In addition, the control circuit 50 superimposes a small signal on the linear drive signal. The small signal is sufficiently small that it does not substantially contribute to the heating of the wire compared to the linear drive signal, for example by being at least an order of magnitude smaller. The small signal is subsequently extracted independently of the linear drive signal and then used to provide a measure of resistance. This may be achieved by the small signal having a high frequency relative to the linear drive signal so that it can be extracted by filtering.

To provide a measure of resistance, the small signal may be a constant-current signal. In this case the voltage of the small signal extracted from the SMA actuator 51 is measured to provide a measure of resistance.

This second technique provides an accurate measure of resistance, independent of the linear drive signal, but has the disadvantage of requiring complex electronics to superimpose and extract the small signal.

A third technique is to use pulse-width modulation (PWM). In this case, the control circuit 50 applies a pulse-width modulated current and varies the duty cycle in order to vary the amount of current applied and hence the heating. Use of PWM provides the advantage that the amount of power supplied may be accurately controlled with a fine resolution. This method provides a high signal-to-noise ratio, even at low drive power. The PWM may be implemented using known PWM techniques. Typically, the control circuit 50 will continually supply a pulse of current, for example varying in the range from 5% to 95%. When the duty cycle is at a low value within this range, the average power displayed in the SMA actuator 51 is low and so the wire cools even though some current is being supplied. Conversely, when the duty cycle is at a high value in the range, the SMA actuator 51 heats.

With this third technique, the resistance is measured during the current pulse, for example after a short, predetermined delay from the start of the pulse. One option is to use a constant-voltage current source in which case the current flowing through the SMA actuator 51 is measured and used as a measure of the resistance. This has the difficulty that measuring current requires a relatively complex circuit, for example employing a resistor in series with the SMA actuator 51 and an amplifier to amplify the voltage across the resistor for measurement by a digital circuit. A second option is to use a constant-current current source. In this case, the voltage across the SMA actuator 51 is measured to provide a measure of the resistance.

Figure 13:
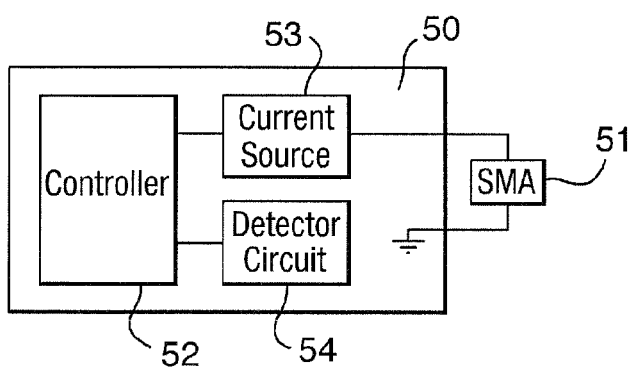
FIG. 13 is a diagram of the control circuit.
Figure 16:
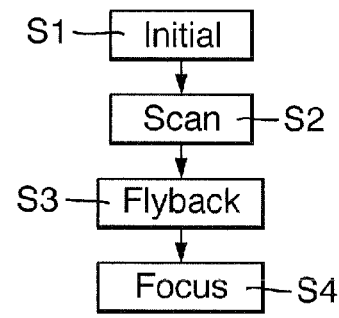
FIG. 16 is a flow chart of an autofocus control algorithm which may be implemented in the control circuit.

An example in which the control circuit 50 implements the third technique with a constant-current current source is shown in FIG. 13 and is arranged as follows.

The control circuit 50 includes a constant-current current source 53 which is connected to supply current to the SMA actuator 51. For example, in the first camera 1, the constant current might be of the order of 120 mA.

The control circuit 50 further includes a detection circuit 54 arranged to detect the voltage across the SMA actuator 51. A controller 52 implemented by a suitable microprocessor controls the current source 53 to supply a pulse-width modulated current. The controller 52 receives the detected voltage measured by the detection circuit 54 and performs the PWM control in response thereto.

Figure 14:
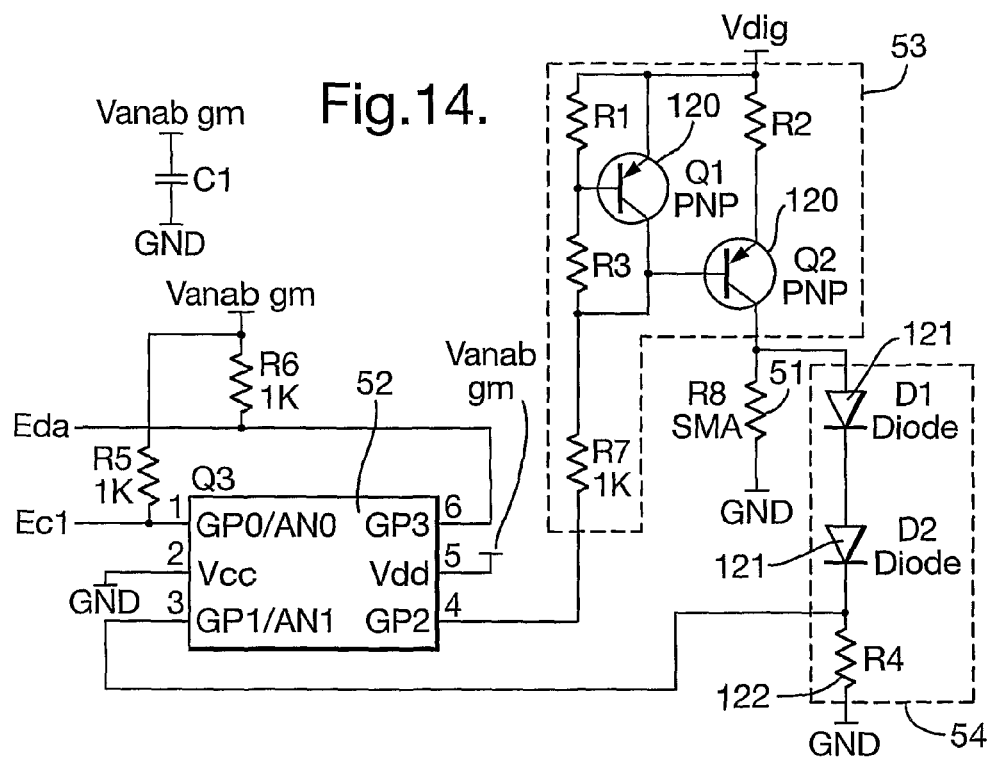
FIGS. 14 and 15 are diagrams of two possible circuit implementations for the control circuit.
Figure 15:
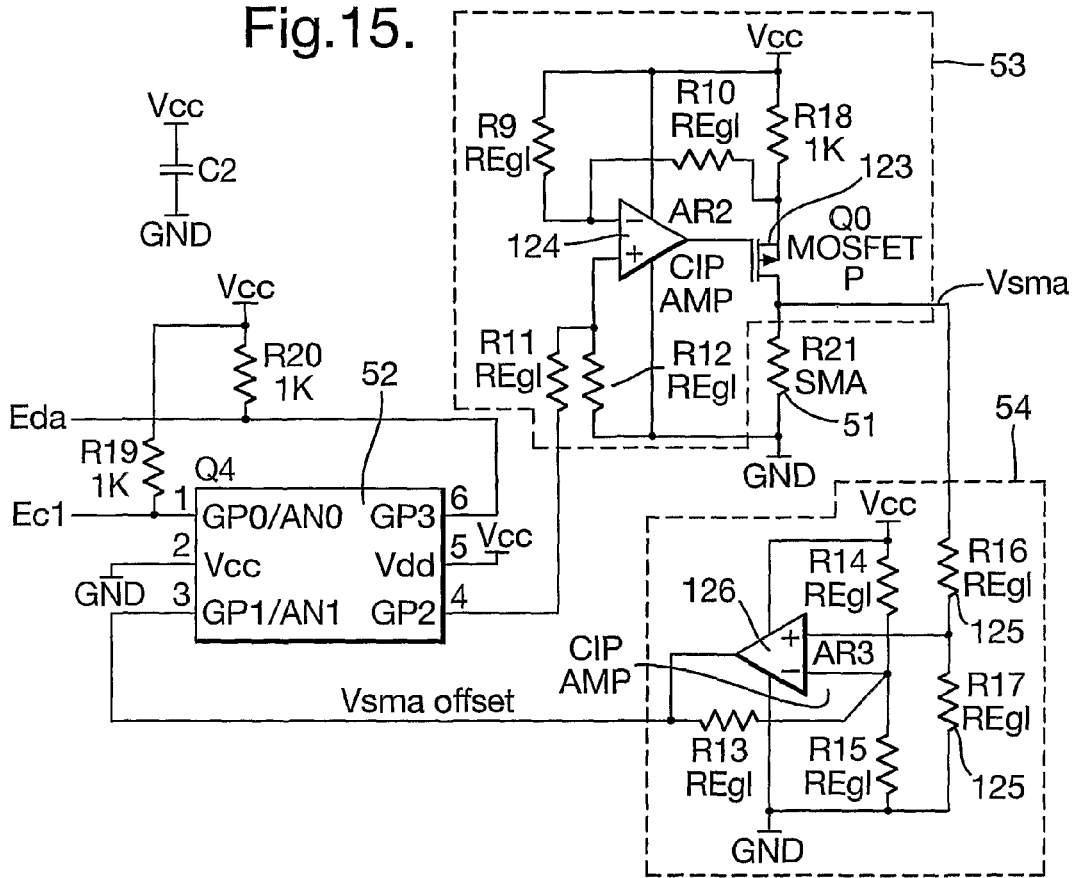

Two detailed circuit implementations for the control circuit 50 illustrated in FIG. 13 are shown in FIGS. 14 and 15.

The first circuit implementation of FIG. 14 is cheap but has limited performance. In particular, the current source 53 is implemented using a simple arrangement of bipolar transistors 120. The voltage detector circuit 54 is formed as a simple bridge arrangement of a pair of diodes 121 and a resistor 122.

The second circuit implementation of FIG. 15 is more accurate but is more expensive. In particular, the current source 52 is implemented by a MOSFET transistor 123 controlled by an operational amplifier 124. The detection circuit 125 is implemented by a bridge arrangement of two resistors 125, the output of which is amplified by an operational amplifier 126. The operational amplifier 126 allows the A/D convertor of the controller 52 to make use of its full dynamic range.

The controller 52 may implement a number of control algorithms to vary the duty cycle of the pulse-width modulated current output by the current source 53. One possibility is proportional control in which the duty cycle is varied by an amount proportional to the difference between the detected resistance and the target resistance. As the SMA actuator 51 heats across the active temperature region, the decrease in resistance is sensed and used as in a feedback control technique. The stability of the feedback control is maintained by the inherent proportional-integral action of the SMA actuator 51 itself during heating. The overall feedback response is dominated by the response of the whole of the heating of the SMA actuator 51.

The SMA actuator 51 may have some non-linearities in its response. Such non-linearities may be limited by incorporating precompensation in the control circuit 50. One option is for the precompensation to consist of a gain or offset modifier on the output signal supplied to the current source 53, for example based on the demand and the history of the demand signal. This is most beneficial if insufficient feedback is present to control the SMA actuator 51.

It has been appreciated that during heating of the SMA actuator 51, the resistance varies with the length of the SMA actuator 51 in a manner which is consistent from sample to sample and in successive heating cycles. However, during cooling the variation of resistance is less repeatable from sample to sample and there is variable hysteresis as compared to the heating. This does not prevent the use of resistance as a measure of position during cooling altogether, but does reduce the accuracy of the control. This problem may be reduced by the control circuit 50 following a predetermined and repeated motion routine, for example employing a flyback technique of which an example is described below.

The control circuit 50 may implement an autofocus algorithm. In this case, the control may be based on a measure of the focus of the image, for example a modulation transfer function or a spatial frequency response, derived from the image signal from the image sensor 4. A wide range of suitable measures are known and any such measure may be applied.

In this case, there is a limitation that the derivation of the measure of focus is slow. To combat this, during a scan across many focus positions, at the desired focus position determined from the measure of focus, the control circuit 50 may determine a measure of the position of the lens element 6 using a sensor as discussed above. Then at the end of the scan the lens element 6 is driven back to the same position of the basis of that measure of the position rather than the focus measure.

In this case, as image signal from the image sensor 4 is used to derive the primary feedback parameter, any drifting in the absolute values of the measure of the position as a secondary parameter over repeated cycles and age is irrelevant, under the condition that there is no perceivable change over the course of a single auto-focus cycle. This condition is met using the resistance of the members 13 as the measure of position. For example, in a given apparatus, the resistance might vary from 10 Ohms at high temperature to 12 Ohms at low temperature, and then over the course of several 100 k cycles, this may change to 15 Ohms at high temperature and 20 Ohms at low temperature, However, for any given cycle, best focus will correspond to a specific resistance to a sufficient degree of accuracy. Thus it is only necessary to return to this specific resistance, irrespective of its absolute value.

An example of an autofocus cycle which may be implemented by a control algorithm performed in the control circuit 50 is shown in FIG. 15 and will now be described. The autofocus cycle employs a flyback technique.

The autofocus cycle starts with the SMA actuator 51 in the martensite phase. In this initial state, the control circuit 50 might apply no current or might apply a pulse-width modulated current with a minimum duty cycle.

In the initial phase S1, the control circuit 50 heats the SMA material from the martensite phase to reach the active temperature region from which the stress developed in the SMA material increases. The heating is achieved by the control circuit 50 supplying pulse-width modulated current with the maximum duty cycle. The controller 52 monitors the voltage across the SMA actuator 51 detected by the detector circuit 54 as a measure of the resistance of the SMA actuator 51. Outside the active temperature region the resistance increases with temperature, but within the active temperature region the resistance decreases as the SMA actuator 51 shortens. Accordingly, the peak resistance indicates the start of the active temperature region. The controller 52 stops the initial phase S1 and starts the scan phase S2 in response to the voltage across the SMA actuator 51 decreasing.

During the scan phase S2, the SMA actuator 51 is scanned across the active temperature region. This is achieved by use of a series of test values of the voltage across the SMA actuator 51 which acts as a measure of resistance. Each of the test values is used in turn as a target value for the feedback control technique implemented by the controller 52. The duty cycle of the pulse-width modulated current output by the current source 53 is controlled using the measured voltage across the SMA actuator 51 as a feedback signal with the result that the feedback control technique drives this voltage to the test value. Once the measured voltage has reached the test value, a measure of the quality of the focus of the image signal output by the image sensor 4 is derived and stored in the memory of the controller 52. The process is repeated for each of the test values. Successive test values increase, so that the temperature of the SMA actuator 51 is raised monotonically. In this way, as the SMA actuator 51 is heated during the scan phase, the quality of focus of the image signal is monitored.

The test values may be disposed linearly across the active temperature range, but this is not necessary. Alternatively the test values could be unequally spread for example concentrated in a particular part of the range.

The stored measures of focus quality are used to derive a focus value of the control signal at which the focus quality is at an acceptable level. Most simply this is done by selecting one of the plurality of test values having the best measure of focus quality. As an alternative, it is possible to predict the value of the resistance which would provide the best focus from the test values using a curve-fitting technique. Thus the focus value need not be one of the test values. The curve fit may be a simple mathematic equation such as an Mth order polynomial where M>1 or instead could be chosen as a best-fit to a curve taken from a library of curves premeasured from representative scenes.

The focus value may be determined at the end of the scan phase S2 or may be determined on-the-fly during the scan phase S2. The focus value is stored in the memory of the controller 52 for subsequent use.

Next, in the flyback phase S3 the SMA material is cooled into the martensite phase. This may be achieved by applying a pulse-width modulated current with a minimum duty cycle, although it could alternatively be achieved by applying no current at all. The transformation into the martensite phase indicating the end of the flyback phase can be detected by the controller 52 monitoring the voltage measured by the detector circuit 54. Alternatively, the flyback phase can simply be maintained for a pre-determined time selected to be sufficiently long to allow the SMA actuator 51 to cool under any expected operating conditions.

Next, in the focusing phase S4 the SMA actuator 51 is heated to return it to the position corresponding to the focus value determined at the end of the scan phase. This is achieved by the control circuit 52 applying the feedback control technique with the stored focus value being used as a target value so that the measured voltage across the SMA actuator 51 used as the feedback signal is driven to that stored focus value. The temperature rise is again monotonic, as in the scan phase S2. As discussed above, as a result of the flyback technique the problem of hysteresis in the SMA actuator 51 is overcome such that the lens element 6 is known to be at the position corresponding to the stored focus value.

As an alternative technique to obtain an in-focus image, the control circuit 50 may apply the technique described in WO-2005/093510.

An alternative form of the control circuit 50 simply drives the lens element 2 into two positions, corresponding to near-focus and far-focus. In this case, the control circuit 50 either supplies no current or supplies current to move the lens element 2 to the near-focus position. This has the benefit of allowing the control circuit 50 to be much simpler, and therefore more compact and lower cost. For example for the near-focus position the control circuit 50 may apply a fixed current without any feedback, but even if feedback is used a low degree of accuracy is needed allowing the feedback control to be simpler. A camera incorporating such two-focus position control offers improved image quality compared to a fixed-focus camera, but at lower cost and size than a camera with full autofocus control.

Whilst the embodiments described above relate to a camera incorporating an SMA actuation arrangement which drives movement of a camera lens element, the SMA actuation arrangements described can equally be adapted to drive movement of an object other than a camera lens element.

The invention claimed is:

1. A camera lens actuation apparatus comprising:
a support structure;
a camera lens element supported on the support structure by a suspension system which guides movement of the camera lens element relative to the support structure along the optical axis of the camera lens element; and
at least one pair of lengths of SMA wire held in tension between the camera lens element and the support structure, the lengths of SMA wire in the pair being coupled to one of the camera lens element and the support structure at a common point and extending therefrom at acute angles of opposite sign relative to the optical axis as viewed radially of the optical axis, the lengths of SMA wire in the pair extending at an angle of less than 180° relative to each other as viewed along the optical axis.

2. A camera lens actuation apparatus according to claim 1, wherein the lengths of SMA wire in the pair extend at an angle of substantially 90° relative to each other as viewed along the optical axis.

3. A camera lens actuation apparatus according to claim 1, wherein the lengths of SMA wire in the pair are of identical length.

4. A camera lens actuation apparatus according to claim 1, wherein the lengths of SMA wire in the pair are portions of a single piece of SMA wire.

5. A camera lens actuation apparatus according to claim 1, wherein said one of the camera lens element and the support structure is the camera lens element.

6. A camera lens actuation apparatus according to claim 1, wherein the piece of SMA wire is coupled to said one of the support structure and the camera lens element by being hooked over a retaining element of said one of the support structure and the camera lens element.

7. A camera lens actuation apparatus according to claim 1, comprising plural, identical pairs of lengths of SMA wire disposed symmetrically around the optical axis.

8. A camera lens actuation apparatus according to claim 1, wherein the at least one pair of lengths of SMA wire form part of a subassembly further comprising at least one mounting member connected to the SMA wire, the subassembly being arranged with the at least one mounting member mounted to at least one of the support structure and the camera lens element.

9. A camera lens actuation apparatus according to claim 1, wherein the camera lens element includes one or more lenses having a diameter of at most 10 mm.

10. A camera lens actuation apparatus according to claim 1, wherein the suspension system is arranged to provide biasing of the camera lens element relative to the support structure in an opposite direction along said optical axis from the tensional force applied by the at least one piece of SMA wire.

11. A camera lens actuation apparatus according to claim 10, wherein the suspension system comprises a plurality of resilient flexures coupled between the camera lens element and the support structure, the flexures being flexed to provide said biasing.

12. A camera lens actuation apparatus comprising:

a support structure;

a camera lens element supported on the support structure by a suspension system which guides movement of the camera lens element relative to the support structure along the optical axis of the camera lens element; and a plurality of equal lengths of SMA wire held in tension between the camera lens element and the support structure at respective acute angles to the optical axis of the same magnitude applying a tensional force having a component along the optical axis, a set of half the lengths of SMA wire being inclined at an acute angle of a first sign and a set of half the lengths of SMA wire being inclined at an acute angle of a second, opposite sign as viewed radially of the optical axis, the lengths of SMA wire in each set being arranged with rotational symmetry around the optical axis, whereby the lengths of SMA wire are held in positions and orientations around the optical axis such that the forces generated between the camera lens element and the support structure by the lengths of SMA wire when heated by a current of the same value in each length of SMA wire have a net component along the optical axis but have substantially no net component perpendicular to the optical axis and provide substantially no net torque around any axis perpendicular to the optical axis and further provide substantially no net torque around the optical axis.

13. A camera lens actuation apparatus according to claim 12, wherein the plurality of lengths of SMA wire are each held perpendicular to a notional line between its midpoint and the optical axis.

14. A camera lens actuation apparatus according to claim 12, wherein the plurality of lengths of SMA wire are portions of a single piece of SMA wire.

15. A camera lens actuation apparatus according to claim 12, wherein the lengths of SMA wire are connected to at least one of the camera lens element and the support structure by crimps crimping the SMA wire.

16. A camera lens actuation apparatus according to claim 12, wherein at least two lengths of SMA wire are formed by a single piece of SMA wire hooked over at least one retaining element of at least one of the support structure and the camera lens element holding the lengths of SMA wire in tension.

17. A camera lens actuation apparatus according to claim 12, wherein the camera lens element includes one or more lenses having a diameter of at most 10 mm.

18. A camera lens actuation apparatus according to claim 12, wherein the suspension system is arranged to provide biasing of the camera lens element relative to the support structure in an opposite direction along said optical axis from the tensional force applied by the at least one piece of SMA wire.

19. A camera lens actuation apparatus according to claim 18, wherein the suspension system comprises a plurality of resilient flexures coupled between the camera lens element and the support structure, the flexures being flexed to provide said biasing.

20. A camera lens actuation apparatus according to claim 19, wherein the resilient flexures are disposed with rotational symmetry around the optical axis.

21. A camera lens actuation arrangement comprising:

a support structure;

a camera lens element supported on the support structure by a suspension system which guides movement of the camera lens element relative to the support structure along the optical axis of the camera lens element;

a plurality of equal lengths of SMA wire held in tension between the camera lens element and the support structure at respective acute angles to the optical axis of the same magnitude, a set of half the lengths of SMA wire being inclined upwardly and a set of half the lengths of SMA wire being inclined downwardly as viewed radially of the optical axis, the lengths of SMA wire in each set being arranged with rotational symmetry around the optical axis.

22. A camera lens actuation apparatus for driving motion of a camera lens element relative to a support structure, the actuation arrangement comprising:

a support structure, a camera lens element supported on the support structure by a suspension system which guides movement of the camera lens element relative to the support structure along the optical axis of the camera lens element, a subassembly comprising at least one piece of SMA wire connected to at least one mounting member to form a continuous loop including the SMA wire, the subassembly being arranged with the at least one mounting member mounted to at least one of the support structure and the camera lens element and with the at least one piece of SMA wire held in tension between the camera lens element and the support structure applying a tensional force along the optical axis.

23. A camera lens actuation apparatus according to claim 22, wherein the subassembly comprises a plurality of mounting members.

24. A camera lens actuation apparatus according to claim 23, wherein the subassembly comprises a single piece of wire.

25. A camera lens actuation apparatus according to claim 23, wherein the at least one piece of SMA wire is connected to at least one mounting member by at least one piece of SMA wire being crimped by crimps formed in the at least one mounting member.

26. A camera lens actuation apparatus according to claim 22, wherein the SMA wire is hooked over at least one retaining element of at least one of the support structure and the camera lens element holding the lengths of SMA wire extending from each side of the retaining element in tension.

27. A camera lens actuation apparatus according to claim 22, wherein the at least one mounting member makes electrical contact with the at least one piece of SMA wire.

28. A camera lens actuation apparatus according to claim 27, wherein the subassembly includes at least one mounting member made of metal and connected to the SMA wire in a plurality of separated locations.

29. A camera lens actuation apparatus according to claim 22, wherein the camera lens element includes one or more lenses having a diameter of at most 10 mm.

30. A camera lens actuation apparatus according to claim 22, wherein the suspension system is arranged to provide biasing of the camera lens element relative to the support structure in an opposite direction along said optical axis from the tensional force applied by the at least one piece of SMA wire.

31. A camera lens actuation apparatus according to claim 30, wherein the suspension system comprises a plurality of resilient flexures coupled between the camera lens element and the support structure, the flexures being flexed to provide said biasing.

32. A camera lens actuation apparatus according to claim 31, wherein the resilient flexures are disposed with rotational symmetry around the optical axis.

33. A camera lens actuation apparatus according to claim 22, wherein the continuous loop is arranged extending around the camera lens element to be moved with a plurality of lengths of the at least one piece of wire held at respective acute angles to the optical axis applying a tensional force having a component along the optical axis.

34. A camera lens actuation apparatus according to claim 33, wherein the lengths of SMA wire are held in positions and orientations around the optical axis such that the forces generated between the camera lens element and the support structure by the lengths of SMA wire when heated by a current of the same value in each length of SMA wire have a net component along the optical axis but have substantially no net component perpendicular to the optical axis and provide substantially no net torque around any axis perpendicular to the optical axis.

35. A camera lens actuation apparatus according to claim 34, wherein said the forces generated between the camera lens element and the support structure by the lengths of SMA wire when heated by a current of the same value in each length of SMA wire further provide substantially no net torque around the optical axis.

36. A camera lens actuation apparatus according to claim 22, wherein the plurality of lengths of SMA wire are equal lengths of SMA wire held at respective acute angles to the optical axis of the same magnitude, a set of half the lengths of SMA wire being inclined upwardly and a set of half the lengths of SMA wire being inclined downwardly as viewed radially of the optical axis, the lengths of SMA wire in each set being arranged with rotational symmetry around the optical axis.

* * * * *